(12) United States Patent
Kinoshita et al.

(10) Patent No.: US 7,995,112 B2
(45) Date of Patent: Aug. 9, 2011

(54) IMAGE-PROCESSING APPARATUS AND IMAGE-PICKUP APPARATUS

(75) Inventors: Masaya Kinoshita, Kanagawa (JP); Seijiro Inaba, Kanagawa (JP); Keizo Gomi, Kanagawa (JP)

(73) Assignee: Sony Corporation (JP)

( * ) Notice: Subject to any disclaimer, the term of this patent is extended or adjusted under 35 U.S.C. 154(b) by 1111 days.

(21) Appl. No.: 11/451,231

(22) Filed: Jun. 12, 2006

(65) Prior Publication Data

US 2007/0013785 A1 Jan. 18, 2007

(30) Foreign Application Priority Data

Jun. 13, 2005 (JP) ................. P2005-172109
Nov. 9, 2005 (JP) ................. P2005-325268

(51) Int. Cl.
*H04N 5/228* (2006.01)
*H04N 9/73* (2006.01)
(52) U.S. Cl. ............ 348/226.1; 348/222.1; 348/228.1
(58) Field of Classification Search ..... 348/222.1–228.1
See application file for complete search history.

(56) References Cited

U.S. PATENT DOCUMENTS

| | | | |
|---|---|---|---|
| 6,710,818 B1* | 3/2004 | Kasahara et al. | 348/607 |
| 6,829,371 B1* | 12/2004 | Nichani et al. | 382/103 |
| 6,995,801 B1* | 2/2006 | Nakakuki et al. | 348/364 |
| 7,250,984 B2* | 7/2007 | Nomura et al. | 348/607 |
| 7,280,135 B2* | 10/2007 | Kim | 348/228.1 |
| 7,289,144 B2* | 10/2007 | Arazaki | 348/228.1 |
| 7,298,401 B2* | 11/2007 | Baer | 348/226.1 |
| 2003/0122759 A1* | 7/2003 | Abe et al. | 345/89 |
| 2004/0086043 A1* | 5/2004 | Ito et al. | 375/240.11 |
| 2004/0201729 A1* | 10/2004 | Poplin et al. | 348/226.1 |
| 2005/0062702 A1* | 3/2005 | Lee et al. | 345/89 |

FOREIGN PATENT DOCUMENTS

| | | |
|---|---|---|
| EP | 1 496 690 A | 1/2005 |
| JP | 9-307792 A | 11/1997 |
| JP | 11-088911 A | 3/1999 |
| JP | 2001-111887 A | 4/2001 |
| JP | 2003-338988 A | 11/2003 |
| JP | 2004-222228 A | 8/2004 |
| JP | 1 566 962 A1 | 8/2005 |
| JP | 2006-345368 | 12/2006 |

OTHER PUBLICATIONS

Christian Hentschel, Comparison Between Median Filtering and Vertical Edge Controlled Interpolation for Flicker Reduction, Jul. 9, 1989, IEEE Transactions on Consumer Electronics, vol. 35, No. 3, pp. 279-289.*

* cited by examiner

*Primary Examiner* — Jason Chan
*Assistant Examiner* — Pritham Prabhakher
(74) *Attorney, Agent, or Firm* — Lerner, David, Littenberg, Krumholz & Mentlik, LLP

(57) ABSTRACT

An image-processing apparatus includes an integration section to integrate an image signal in more than one unit of horizontal synchronization period; an interpolation section to carry out an interpolation on the basis of integration values output by the integration section in order to generate integration values corresponding to a predetermined number of sampling positions set in advance during at least one period of flickers appearing on a screen under a fluorescent lamp; a normalization section to normalize an integration value output by the interpolation section or to normalize a difference value between integration values output by the interpolation section as integration values for adjacent fields or frames, respectively; a frequency analysis section to extract a spectrum of normalized integration value or difference values output by the normalization section; and a flicker inference section to infer a flicker component from the spectrum extracted by the frequency analysis section.

25 Claims, 22 Drawing Sheets

IMAGE-PROCESSING APPARATUS AND IMAGE-PICKUP APPARATUS

CROSS-REFERENCE TO RELATED APPLICATIONS

The present application claims priority from Japanese Patent Application Nos. JP 2005-172109, filed on Jun. 13, 2005, and JP 2005-325268, filed on Nov. 9, 2005, the disclosures of which are hereby incorporated by reference herein.

BACKGROUND OF THE INVENTION

The present invention relates to an image-processing apparatus for processing an image signal and an image-pickup apparatus having the function of the image-processing apparatus. More particularly, the present invention relates to an image-processing apparatus suitable for processing of an image signal representing an image taken by using a solid-state image-pickup device of an XY address scanning type and relates to an image-pickup apparatus having the function of such an image-processing apparatus.

When an object of photographing is photographed in illumination of a blinking light source such as a fluorescent lamp driven by a commercial alternating-current power supply by using a video camera, due to a difference between the frequency of the luminance change (or the light-quantity change) of the light source and the vertical synchronization frequency of the camera, brightness/darkness changes are generated along the time axis. The brightness/darkness changes are referred to as the so-called fluorescent flickers. In particular, if an image-pickup device of the XY address scanning type is used, the exposure timing varies from horizontal line to horizontal line so that flickers on a taken image are observed as a pattern caused by a luminance level periodically changing in the vertical direction or a pattern caused by variations in hue. An example of the image-pickup device of the XY address scanning type is a CMOS (Complementary Metal Oxide Semiconductor).

As a technique for eliminating such flicker components from a signal representing a taken image, a shutter correction method and a gain correction method are generally known. The shutter correction method is a correction method based on relations between the speed of the shutter and the level of flickers. On the other hand, the gain correction method is a method for detecting the waveform of flickers and using the inverted waveform of the detected waveform as a correction gain to be applied to a signal representing an image. In accordance with a flicker reduction method based on the gain correction method, changes of the level of a signal representing an image are subjected to a frequency analysis to detect a spectrum of the flicker frequency and the level of a signal representing an image is then corrected on the basis of the amplitude of the spectrum. For more information on this flicker reduction method, the reader is suggested to refer to Japanese Patent Laid-open No. 2004-222228, which is explained in paragraphs [0072] to [0111] with reference to FIG. 4.

FIG. 21 is an explanatory diagram referred to in describing an outline of the conventional flicker detection procedure. As shown in FIG. 21, the flicker reduction method disclosed in Japanese Patent Laid-open No. 2004-222228 includes:

a step S11 of sampling one period of a flicker waveform while converting an input signal representing an image into a signal having a proper form;

a step S12 of computing a frequency spectrum of flicker components composing the one period of a flicker waveform as a fundamental waveform by application of a DFT (Discrete Fourier Transform) process to the sampled data; and a step S13 of inferring a flicker waveform by using only low-order terms of the spectrum.

At the step S11 of sampling the one period of a flicker waveform, to put it concretely, the signal representing an image is sequentially integrated typically for each line oriented in the horizontal direction in order to reduce effects of the picture. In the DFT processing carried out at the step S12, an average of integration values obtained over a plurality of fields is found and the average is used for normalizing the integration values in order to make luminance changes caused by flickers in a screen area match changes in colors. By carrying out such processing, the flicker waveform can be detected with a high degree of accuracy independently of the photographing object and the level of the signal representing an image.

By the way, in recent years, the number of pixels on an image-pickup device employed in a video camera or a similar apparatus has been increasing fast. That is to say, the number of lines oriented in the horizontal direction has increased from several hundreds to several thousands. In consequence, if the integration values obtained for all the lines in a process to sample one period of a flicker waveform are all used, the size of a processing circuit including a memory for storing the integration values and a DFT processing circuit also rises inevitably.

On the other hand, in the case of the NTSC (National Television Standards Committee) system, for example, the period of the waveform of flickers generated by a fluorescent lamp is shorter than the length of one vertical synchronization period so that the flickers appear on one screen as several stripes. Thus, by consideration from the sampling theorem, the number of sampling points on L lines corresponding to one period of the flicker waveform is redundant. That is to say, several tens of points taken from the one period of the flicker waveform as sampling points are a number large enough for providing sufficient detection precision. For example, 64 sampling points are sufficient. Thus, in an actual flicker detection process, the processing to sample one period of the flicker waveform is carried out by thinning data being sampled in the vertical direction so as to reduce the size of the processing circuit.

FIG. 22 is an explanatory diagram referred to in describing an outline of a flicker detection procedure executed to thin data being sampled.

The procedure shown in FIG. 22 begins with a step S21 at which L lines corresponding to one period of the flicker waveform are sampled from an input signal representing an image to generate L pieces of sampling data in a way similar to the step S11 of the procedure shown in FIG. 21. Then, at the next step S22, the L pieces of sampling data are thinned down to output L1 pieces of sampling data where the numbers L and L1 satisfy the following relation: L>>L1. As a thinning technique, it is possible to adopt a thinning method for simply outputting one piece of thinned sampling data for every predetermined period or outputting one piece of thinned sampling data by carrying out a process taking a predetermined number of pieces of input sampling data as a base. An example of the process is an LPF (Low Pass Filter) process. Then, at the next step S23, pieces of sampling data at the L1 points are subjected to a DFT process in the same say as the procedure shown in FIG. 21. Subsequently, at the next step S24, a flicker waveform is inferred from a result of a frequency analysis. The processing as above described can reduce a capacity of a memory which retains sampling data for carrying out DFT processing.

By the way, in accordance with the flicker detection method described above, by taking just one period of a flicker waveform as a sampling unit of the flicker waveform on the basis of the sampling theorem, the flicker waveform can be detected with a high degree of accuracy. If a line is sampled by thinning the line at a fixed rate of L/L1, however, it is no longer possible to accurately sample a period equivalent to one period of a flicker waveform unless the value of L/L1 is an integer. For this reason, a frequency spectrum array obtained from sampling values for such a case is different from that obtained as a result of a Fourier series expansion applied to the conventional flicker waveform with one period of a sinusoidal waveform. Thus, a detection error is inevitably generated.

In order to avoid such a detection error, it is necessary to design the processing circuit so as to provide a proper thinning unit according to the number of lines composing the image-pickup device employed in the image-pickup apparatus. In recent years, however, for the purpose of reducing the cost and other purposes, there is a demand for a processing circuit that can be used as a circuit common to a variety of products or a processing circuit capable of keeping up with future changes in specification with ease, and such a demand is also raised as a demand for a circuit for detection of flickers. To be more specific, there is also a demand for a flicker detection circuit that can be used as a circuit common to products having different numbers of pixels composing the image-pickup device employed in each of the products and is capable of avoiding a detection error described above without much changing the configuration of the circuit.

SUMMARY OF THE INVENTION

Addressing the problems described above, inventors of the present invention have devised an image-processing apparatus that is capable of eliminating flicker components from an image taken by using a solid-state image-pickup device of the XY address scanning type with a high degree of precision and exhibits high versatility.

As another desire of the present invention, the inventors have also devised an image-pickup apparatus capable of eliminating flicker components from an image taken by using a solid-state image-pickup device of the XY address scanning type with a high degree of precision.

In accordance with an embodiment of the present invention, there is provided an image-processing apparatus for processing an image signal. The image-processing apparatus includes integration means, interpolation means, normalization means, frequency analysis means, and flicker inference means. The integration means integrates the image signal in more than one unit of horizontal synchronization period. The interpolation means carries out an interpolation process on the basis of integration values output by the integration means in order to generate integration values corresponding to a predetermined number of sampling positions set in advance during at least one period of flickers appearing on a screen under a fluorescent lamp. The normalization means normalizes an integration value output by the interpolation means or normalizes a difference value between integration values output by the interpolation means as integration values for adjacent fields or adjacent frames, respectively. The frequency analysis means extracts a spectrum of the normalized integration values or the difference values output by the normalization means. The flicker inference means infers a flicker component from the spectrum extracted by the frequency analysis means.

In the image-processing apparatus described above, the integration means is used for integrating the image signal in more than one unit of horizontal synchronization period, and the interpolation means is used for carrying out an interpolation process on the basis of integration values output by the integration means in order to generate integration values corresponding to a predetermined number of sampling positions set in advance. The sampling positions are sampling positions for a period of flickers or a plurality of periods of flickers. Thus, by driving the normalization means to normalize an integration value output by the interpolation means or to normalize a difference value between integration values output by the interpolation means as integration values for adjacent fields or adjacent frames, respectively, driving the frequency analysis means to extract a spectrum of normalized integration or difference values output by the normalization means, and driving the flicker inference means to infer a flicker component from the spectrum extracted by the frequency analysis means, the flicker component can be detected with a high degree of accuracy.

In accordance with another embodiment of the present invention, there is provided an image-processing apparatus for processing an image signal. The image-processing apparatus includes integration means, normalization means, interpolation means, frequency analysis means, and flicker inference means. The integration means integrates the image signal in more than one unit of horizontal synchronization period. The normalization means normalizes an integration value output by the integration means or normalizes a difference value between integration values output by the integration means as integration values for adjacent fields or adjacent frames, respectively. The interpolation means carries out an interpolation process on the basis of normalized integration or difference values output by the normalization means in order to generate data corresponding to a predetermined number of sampling positions set in advance during at least one period of flickers appearing on a screen under a fluorescent lamp. The frequency analysis means extracts a spectrum of data output by the interpolation means. The flicker inference means infers a flicker component from the spectrum extracted by the frequency analysis means.

In the image-processing apparatus described above, first of all, the integration means is used for integrating the image signal in more than one unit of horizontal synchronization period. Then, the normalization means is used for normalizing an integration value output by the integration means or for normalizing a difference value between integration values output by the integration means as integration values for adjacent fields or adjacent frames, respectively. Subsequently, the interpolation means is used for carrying out an interpolation process on the basis of the normalized integration or difference values output by the normalization means in order to generate integration values corresponding to a predetermined number of sampling positions set in advance during a period of flickers or a plurality of periods of flickers appearing on a screen under a fluorescent lamp. After that, the frequency analysis means is used for extracting a spectrum of data output by the interpolation means. Finally, the flicker inference means is used for inferring a flicker component from the spectrum extracted by the frequency analysis means.

In accordance with a further embodiment of the present invention, there is provided an image-processing apparatus for processing an image signal. The image-processing apparatus includes integration means, normalization means, frequency analysis means, flicker inference means, interpolation means, and image correction means. The integration means integrates the image signal in more than one unit of horizontal synchronization period. The normalization means normalizes an integration value output by the integration means or normalizes a difference value between integration values output by the integration means as integration values for adjacent fields or adjacent frames, respectively. The frequency analysis means extracts a spectrum of the normalized integration or difference values output by the normalization means. The flicker inference means infers a flicker component appearing on a screen under a fluorescent lamp from the spectrum extracted by the frequency analysis means. The interpolation means carryes out an interpolation process on the basis of discrete values of a flicker component inferred by the flicker inference means in order to generate a predetermined number of pieces of data during a period of flicker component or a plurality of periods of a flicker component included in the image signal as pieces of data each prescribed to have an output timing synchronized with the period of an integration unit used by the integration means or synchronized with the period of a multiple of the integration unit. The image correction means eliminates a flicker component from the image signal on the basis of a value output from the interpolation process carried out by the interpolation means as an inferred value of the flicker component.

In the image-processing apparatus described above, first of all, the integration means is used for integrating the image signal in more than one unit of horizontal synchronization period. Then, the normalization means is used for normalizing an integration value output by the integration means or for normalizing a difference value between integration values output by the integration means as integration values for adjacent fields or adjacent frames, respectively. Subsequently, the frequency analysis means is used for extracting a spectrum of the normalized integration or difference values output by the normalization means. After that, the flicker inference means is used for inferring a flicker component appearing on a screen under a fluorescent lamp from the spectrum extracted by the frequency analysis means. Thereafter, the interpolation means is used for carrying out an interpolation process on the basis of discrete values of a flicker component inferred by the flicker inference means in order to generate a predetermined number of pieces of data during a period of flickers or a plurality of periods of a flicker component included in the image signal as pieces of data each prescribed to have an output timing synchronized with the period of an integration unit used by the integration means or synchronized with the period of a multiple of the integration unit. Finally, the image correction means is used for eliminating a flicker component from the image signal on the basis of a value output from the interpolation process carried out by the interpolation means as an inferred value of the flicker component.

In accordance with a still further embodiment of the present invention, there is provided an image-processing apparatus for processing an image signal. The image-processing apparatus includes integration means, normalization means, frequency analysis means, flicker inference means, correction-parameter computation means, interpolation means, and image correction means. The integration means integrates the image signal in more than one unit of horizontal synchronization period. The normalization means normalizes an integration value output by the integration means or normalizes a difference value between integration values output by the integration means as integration values for adjacent fields or adjacent frames, respectively. The frequency analysis means extracts a spectrum of the normalized integration or difference values output by the normalization means. The flicker inference means infers a flicker component appearing on a screen under a fluorescent lamp from the spectrum extracted by the frequency analysis means. The correction-parameter computation means computes a correction parameter for eliminating a flicker component on the basis of an inferred value of a flicker component inferred by the flicker inference means. The interpolation means carries out an interpolation process on the basis of discrete values of correction parameters computed by the correction-parameter computation means in order to generate a predetermined number of pieces of data during a period of flickers or a plurality of periods of a flicker component included in the image signal as pieces of data each prescribed to have an output timing synchronized with the period of an integration unit used by the integration means or synchronized with the period of a multiple of the integration unit. The image correction means eliminates a flicker component from the image signal by using data output from the interpolation process carried out by the interpolation means as the data of the correction parameter.

In the image-processing apparatus described above, first of all, the integration means is used for integrating the image signal in more than one unit of horizontal synchronization period. Then, the normalization means is used for normalizing an integration value output by the integration means or for normalizing a difference value between integration values output by the integration means as integration values for adjacent fields or adjacent frames, respectively. Subsequently, the frequency analysis means is used for extracting a spectrum of the normalized integration or difference values output by the normalization means. After that, the flicker inference means is used for inferring a flicker component appearing on a screen under a fluorescent lamp from the spectrum extracted by the frequency analysis means. Thereafter, the correction-parameter computation means is used for computing a correction parameter for eliminating a flicker component on the basis of an inferred value of a flicker component inferred by the flicker inference means. Then, the interpolation means is used for carrying out an interpolation process on the basis of discrete values of correction parameters computed by the correction-parameter computation means in order to generate a predetermined number of pieces of data during a period of flickers or a plurality of periods of a flicker component included in the image signal as pieces of data each prescribed to have an output timing synchronized with the period of an integration unit used by the integration means or synchronized with the period of a multiple of the integration unit. Finally, the image correction means is used for eliminating a flicker component from the image signal by using data output from the interpolation process carried out by the interpolation means as the data of the correction parameter.

In accordance with an image-processing apparatus according to an embodiment of the present invention, an interpolation process is carried out on the basis of integration values output by integration means in order to generate integration values corresponding to a predetermined number of sampling positions for a period of flickers or a plurality of periods of flickers. Thus, a predetermined number of integration values sampled in a period of flickers or a plurality of periods of flickers can be output with a high degree of reliability independently of the number of lines included in the image signal and the screen rate. As a result, it is possible to implement an image-processing apparatus having enhanced performance to eliminate flickers and good versatility.

In addition, in accordance with an image-processing apparatus according to another embodiment of the present invention, an interpolation process is carried out on the basis of normalized integration or difference values output by normalization means in order to generate pieces of data corresponding to a predetermined number of sampling positions set in advance during a period of flickers or a plurality of periods of flickers. Thus, a predetermined number of pieces of data sampled in a period of flickers or a plurality of periods of flickers can be supplied to frequency analysis means with a high degree of reliability independently of the number of lines included in the image signal and the screen rate. As a result, it is possible to implement an image-processing apparatus having enhanced performance to eliminate flickers and good versatility.

On top of that, in accordance with an image-processing apparatus according to a further embodiment of the present invention, an interpolation process is carried out on the basis of values extracted in a frequency analysis process as discrete values of a flicker component in order to generate a predetermined number of pieces of data during a period of flickers or a plurality of periods of the flicker component included in an image signal as pieces of data each prescribed to have an output timing synchronized with the period of an integration unit used by the integration means or synchronized with the period of a multiple of the integration unit. Then, on the basis of the generated pieces of data, an image signal is corrected. Thus, the phase of an inferred value of a flicker waveform representing the flicker component, discrete values of which are used as the basis of the interpolation process, can be adjusted to match the phase of the image signal supplied to image correction means as a signal to be corrected, allowing the number of errors generated in a process to correct the image signal to be reduced independently of the number of lines included in the image signal and the screen rate. As a result, it is possible to implement an image-processing apparatus having enhanced performance to eliminate flickers and good versatility.

In addition, in accordance with an image-processing apparatus according to a still further embodiment of the present invention, an interpolation process is carried out by using discrete values of correction parameters computed on the basis of values extracted in a frequency analysis process as inferred values of a flicker component in order to generate a predetermined number of pieces of data during a period of flickers or a plurality of periods of the flicker component included in an image signal as pieces of data each prescribed to have an output timing synchronized with the period of an integration unit used by the integration means or synchronized with the period of a multiple of the integration unit. Then, the pieces of data generated as interpolated correction parameters are supplied to image correction means. Thus, the phase of the correction parameter computed on the basis of inferred values of a flicker component can be adjusted to match the phase of the image signal supplied to the image correction means as a signal to be corrected, allowing the number of errors generated in a process to correct the image signal to be reduced independently of the number of lines included in the image signal and the screen rate. As a result, it is possible to implement an image-processing apparatus having enhanced performance to eliminate flickers and good versatility.

BRIEF DESCRIPTION OF THE DRAWINGS

These and other objects and features of the present invention will become clear from the following description of the preferred embodiments given with reference to the accompanying diagrams, in which.

DETAILED DESCRIPTION

Embodiments of the present invention are explained in detail by referring to diagrams as follows.

First Embodiment

<Configuration of the Entire System>

Figure 1:
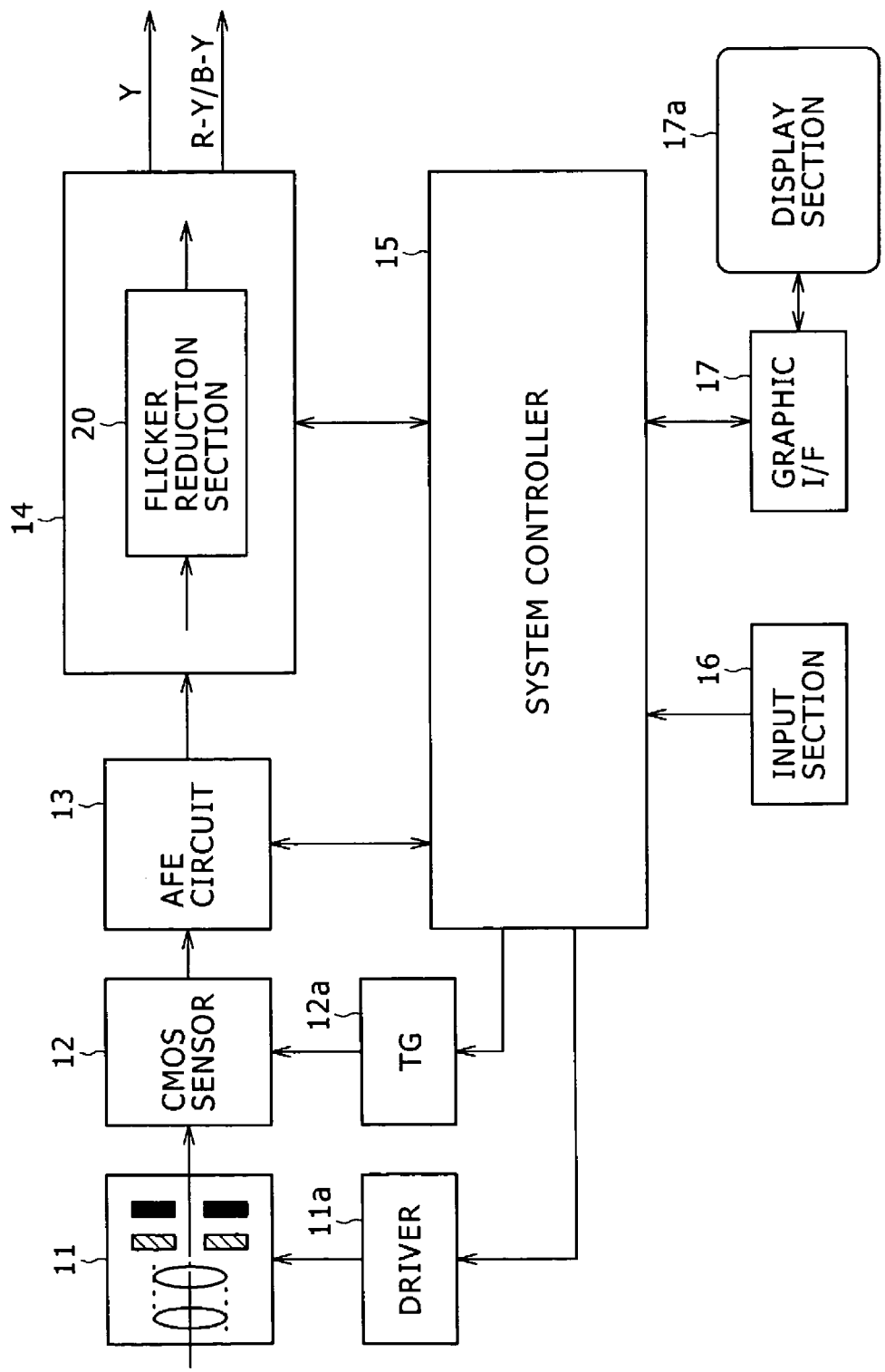
FIG. 1 is a block diagram showing a configuration including components composing an image-pickup apparatus according to a first embodiment of the present invention.

FIG. 1 is a block diagram showing a configuration including components composing an image-pickup apparatus according to the first embodiment of the present invention.

The image-pickup apparatus shown in FIG. 1 has an optical block 11, a driver 11a, a CMOS image sensor 12, a time generator (TG) 12a, an analog front end (AFE) circuit 13, a camera processing circuit 14, a system controller 15, an input section 16, a graphic interface (I/F) 17 and a display section 17a. In the following description, the CMOS image sensor 12 is referred to simply as a CMOS sensor.

The optical block 11 includes a lens, a lens driving mechanism, a shutter mechanism and an iris mechanism. The lens has a function to focus light coming from an object of photographing on the CMOS sensor 12. The lens driving mechanism is a mechanism for moving the lens in order to adjust the focus and carry out a zooming process. The driver 11a controls operations to drive the mechanisms in the optical block 11 on the basis of control signals received from the system controller 15.

The CMOS sensor 12 includes a plurality of pixels, a vertical scanning circuit, a horizontal scanning circuit and an output circuit for outputting a signal representing an image. The pixels are laid out to form a two-dimensional array on a CMOS substrate. The pixels each include a photo diode (a photo gate), a transfer gate (a shutter transistor), a switching transistor (an address transistor), an amplification transistor and a reset transistor (or a reset gate). On the basis of a timing signal received from the timing generator 12a, the CMOS sensor 12 is driven to convert an incident light beam coming from an object of photographing into an electrical signal. The timing generator 12a outputs the timing signal in accordance with control executed by the system controller 15.

The AFE circuit 13 is typically designed as a single IC (Integrated Circuit). For an image signal output by the CMOS sensor 12, the AFE circuit 13 carries out a sample/hold process through CDS (Correlated Double Sampling) processing to hold an S/N (Signal/Noise) ratio well. In addition, the AFE circuit 13 also carries out AGC (Auto Gain Control) processing in order to control the gain. Then, the AFE circuit 13 carries out A/D conversion processing to finally output a digital image signal. It is to be noted that a circuit for carrying out the CDS processing can be built on the same substrate as the CMOS sensor 12.

The camera processing circuit 14 is also typically designed as a single IC. The camera processing circuit 14 is a component for carrying out various kinds of camera signal processing on an image signal received from the AFE circuit 13 or parts of the processing. The camera signal processing includes an AF (Auto Focus) process, an AE (Auto Exposure) process and a white balance adjustment process. Particularly, in the case of this embodiment, the camera processing circuit 14 includes a flicker reduction section 20 for reducing the number of flicker components included in the signal representing an image as components appearing on the screen in a photographing operation carried out in illumination of a fluorescent lamp.

The system controller 15 typically includes a CPU (Central Processing Unit), a ROM (Read Only Memory) and a RAM (Random Access Memory). The system controller 15 is a component for controlling other components of the image-pickup apparatus in an integrated manner by execution of programs stored in the ROM or another memory.

The input section 16 typically includes a variety of operation keys, a lever and a dial, which generate control signals output to the system controller 15 in accordance with an operation carried out by the user. The operation keys include a shutter release button.

The graphic I/F 17 is a component for generating a signal representing an image to be displayed on the display section 17a for displaying an image and supplying the generated signal representing an image to the display section 17a. The graphic I/F 17 generates the signal representing an image from an image signal supplied by the camera processing circuit 14 by way of the system controller 15. The display section 17a is typically an LCD (Liquid Crystal Display) unit for displaying typically a camera-through image being generated in a photographing operation or an image reproduced on the basis of data recorded on a recording medium not shown in the figure.

In the image-pickup apparatus, signals each obtained as a result of an opto-electrical conversion process carried out by the CMOS sensor 12 on light received by the CMOS sensor 12 are sequentially supplied the AFE circuit 13. After completing the CDS and AGC processes carried out by the AFE circuit 13, the signals are converted into a digital image signal. Then, the camera processing circuit 14 carries out an image-quality correction process on the digital image signal received from the AFE circuit 13 prior to a final process to convert the digital image signal into a luminance signal Y and a color-difference signal (R−Y, B−Y).

Image data output by the camera processing circuit 14 is supplied to the graphic I/F 17 by way of the system controller 15. The graphic I/F 17 converts the image data into a signal representing an image to be displayed. In this way, a camera-through image is displayed on the display section 17a. When the user enters a command to record an image to the system controller 15 via the input section 16 by for example carrying out an input operation on the input section 16, the image data received from the camera processing circuit 14 is supplied to an encoder not shown in the figure. The encoder carries out a predetermined compression/encoding process and stores a result of the compression/encoding process in a recording medium also not shown in the figure. In the case of a process to record a standstill image, the camera processing circuit 14 supplies one frame of the image data to the encoder. In the case of a process to record a moving image, on the other hand, image data processed by the camera processing circuit 14 is supplied continuously to the encoder.

<Basic Procedure of the Flicker Reduction Processing>

Figure 2A:
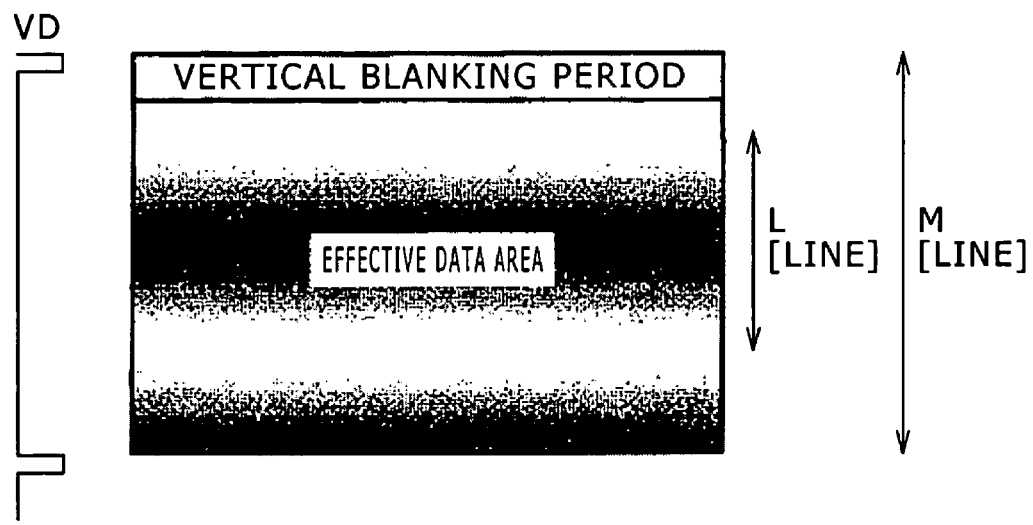
FIGS. 2A and 2B are explanatory diagrams referred to in describing flickers.
Figure 2B:
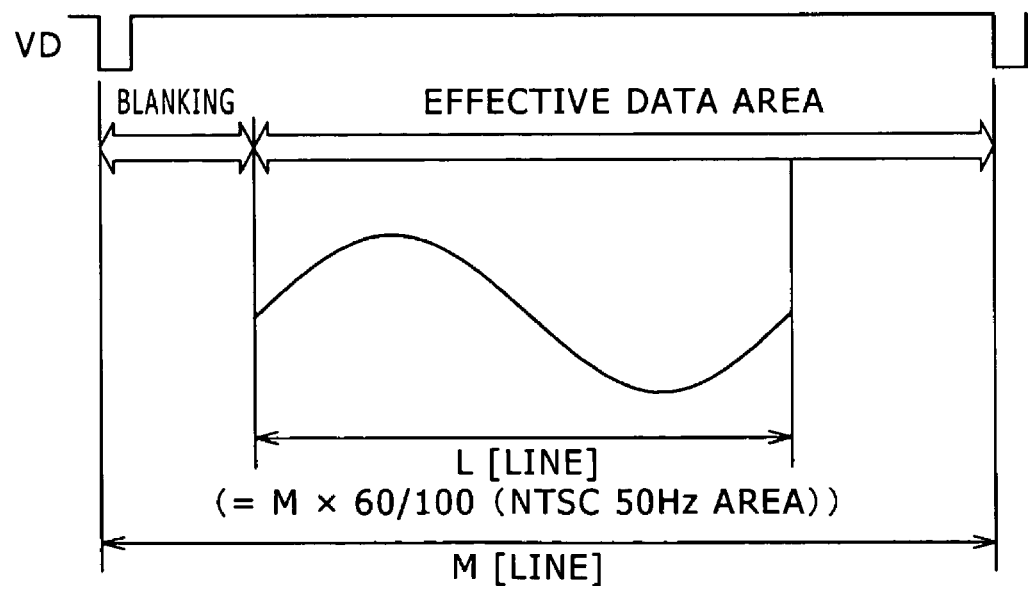

FIGS. 2A and 2B are explanatory diagrams referred to in describing flickers.

Flickers are generated in a photographing operation carried out in illumination of a blinking light source such as fluorescent lamp. In this case, if the image-pickup device having the XY address scanning type takes an image, the flickers are observed as a pattern of a luminance level periodically changing in the vertical direction or a pattern of variations in hue as shown in FIG. 2A. It is to be noted that FIG. 2A shows a state in which flickers appear as a pattern of brightness/darkness for a uniform photographing object. On the other hand, FIG. 2B shows a waveform representing such repetitions of brightness/darkness. In the following description, the waveform representing such repetitions of brightness/darkness is referred to as a flicker waveform.

In the case of a fluorescent lamp driven by a commercial alternating-current power supply having a frequency of 50

Hz, for example, the blinking frequency is 100 Hz. Thus, L representing the number of lines corresponding to one period of the flicker waveform can be expressed as follows:

$$L=(M\times 60/100)$$

where notation M denotes the number of lines read per field including a vertical blanking period for a video signal of the NTSC system with a field frequency of 60 Hz. In addition, the length of such a periodical variation in one field is 100/60=1.66 periods. That is to say, the periodical variation is repeated for every three fields. In the following description, it is assumed that flickers are generated under such a condition.

Figure 3:
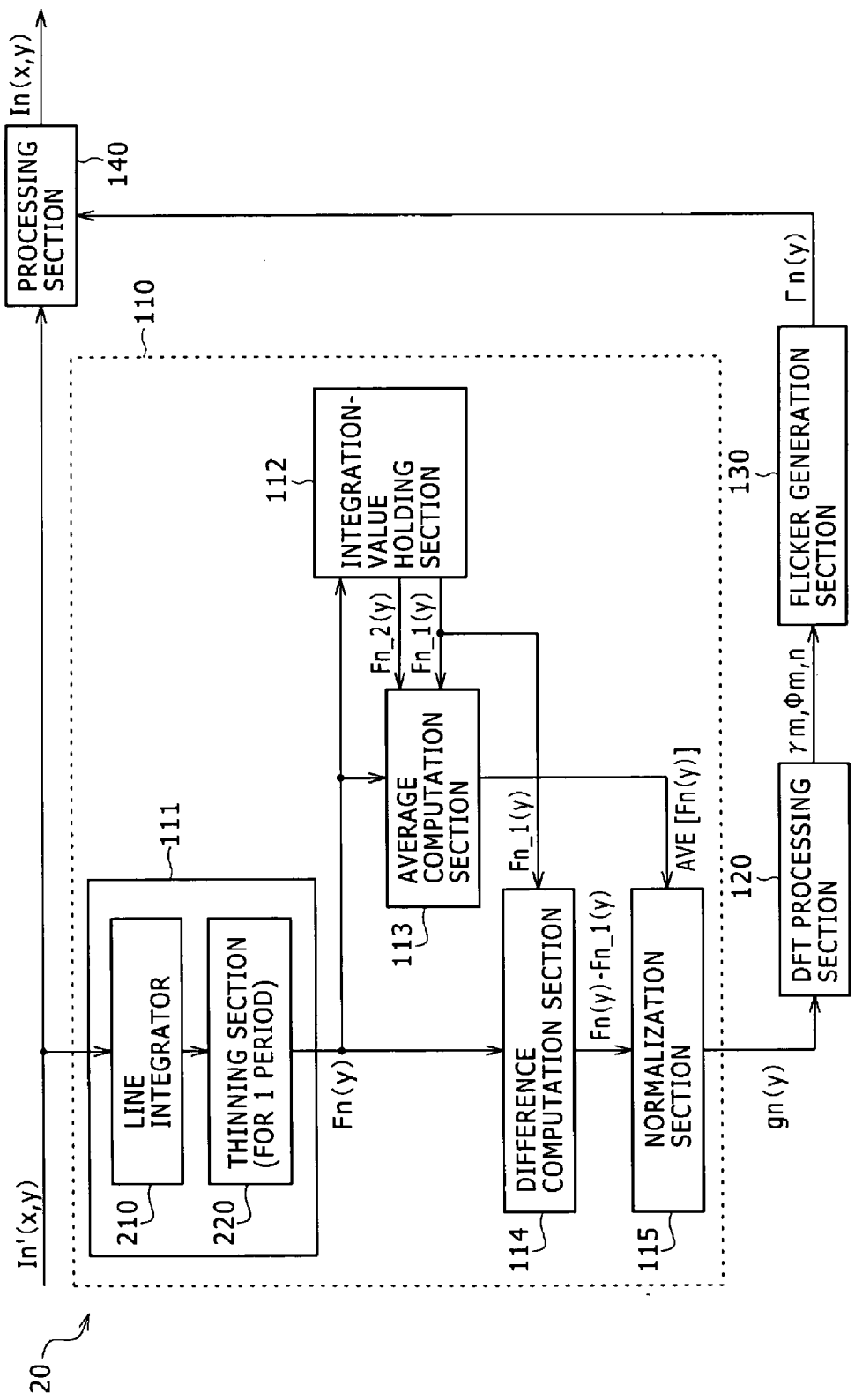
FIG. 3 is a block diagram showing an internal configuration of a flicker reduction section according to the first embodiment.

FIG. 3 is a block diagram showing an internal configuration of the flicker reduction section 20 according to the first embodiment. As shown in the figure, the flicker reduction section 20 includes a normalized integration value computation section 110, a DFT processing section 120, a flicker generation section 130 and a processing section 140. The normalized integration value computation section 110 is a component for detecting a signal representing an image, normalizing the detected values and outputting the normalized values. The DFT processing section 120 is a component for applying a DFT process to the normalized values. The flicker generation section 130 is a component for inferring flicker components from a result of a spectrum analysis based on the DFT process. The processing section 140 is a component for carrying out a process to eliminate the inferred flicker components from the signal representing an image. The normalized integration value computation section 110 includes an integration section 111, an integration-value holding section 112, an average computation section 113, a difference computation section 114 and a normalization section 115.

The integration section 111 is a block for sampling one period of the flicker waveform by integrating the input signal representing an image. The integration section 111 includes a line integrator 210 and a thinning section 220. The line integrator 210 is a component for integrating the input signal representing an image in line units. As will be described later, the thinning section 220 thins the integration results of L lines corresponding to one period of the flicker waveform to produce L1 sampling points determined in advance as a sampling point count L1 satisfying the following relation: L>>L1.

The integration-value holding section 112 is a memory for temporarily holding integration values obtained for two fields. The average computation section 113 is a component for computing an average of integration values obtained for three successive fields. The difference computation section 114 is a component for computing a difference between integration values of two successive fields. The normalization section 115 is a component for normalizing the computed difference.

The DFT processing section 120 carries out a DFT process on the normalized differences to perform a frequency analysis process in order to infer the amplitude and initial phase of a flicker component. The flicker generation section 130 is a component for computing a correction coefficient representing the rate of flicker components contained in the signal representing an image from the inferred values output from the frequency analysis process. The processing section 140 is a component for eliminating inferred flicker components from the signal representing an image on the basis of the computed correction coefficient.

It is to be noted that at least some of the processes carried out by the components described above can be implemented by execution of software in the system controller 15. In addition, in the image-pickup apparatus according to the embodiment, processing is carried out by the blocks shown in FIG. 3 for each luminance signal and each color-difference signal, which compose the signal representing an image. As an alternative, the processing is carried out for each luminance signal and, if necessary, the processing is carried out for each color-difference signal and each chrominance signal. The processing for a luminance signal can be carried out at the stage of a chrominance signal prior to a synthesis with the luminance signal. In addition, the processing of the stage of this chrominance signal can be carried out at the stage of a chrominance signal of the primary colors or a chrominance signal of complementary colors. If processing is to be carried out for these chrominance signals, the blocks shown in FIG. 3 perform the processing for each of the chrominance signal.

Next, processing to detect flickers and reduce flickers is explained by referring to FIG. 3.

In general, flicker components are proportional to the intensity of a signal representing an image of a photographing object. Let notation In' (x, y) denote an input image signal in any sampling period n for an ordinary object of photographing and at any pixel (x, y). The input image signal is the RGB primary signals prior to a process to reduce flickers or a luminance signal prior to a process to reduce the flickers. In this case, In'(x, y) is expressed by Eq. (1) as the sum of a signal component including no flicker component and a flicker component proportional to the signal component.

$$\text{In}'(x,y)=[1+\Gamma n(y)]\times \text{In}(x,y) \quad (1)$$

where notation In(x, y) denotes the signal component and notation $\Gamma n(y)$ denotes a flicker coefficient. Thus, the term $\Gamma n(y)\times \text{In}(x, y)$ denotes the flicker component. Since the light emission period of 1/(100 seconds) for the fluorescent lamp can be assumed to be sufficiently short in comparison with one horizontal period, the flicker coefficient can be regarded as a constant throughout the same line of the same field. Thus, the flicker coefficient can be represented by notation $\Gamma n(y)$.

In order to make the flicker coefficient $\Gamma n(y)$ more general, the coefficient is described as an expansion in the form of a Fourier series as shown in Eq. (2) given below. The flicker coefficient $\Gamma n(y)$ expressed in the form of a Fourier series covers all light emission characteristics and afterglow characteristics. The light emission and afterglow characteristics vary in dependence on the type of the fluorescent lamp.

$$\Gamma n(y) = \sum_{m=1}^{\infty} \Upsilon m \times \cos\left[m\times \frac{2\pi}{\lambda 0}\times y + \Phi m, n\right] \quad (2)$$

$$= \sum_{m=1}^{\infty} \Upsilon m \times \cos(m\times \omega 0\times y + \Phi m, n)$$

Notation $\lambda 0$ used in Eq. (2) denotes the wavelength of the flicker waveform. The wavelength $\lambda 0$ of the flicker waveform corresponds to L (=M×FPS/100) lines where notation M denotes the number of lines read out per field. Notation $\omega 0$ denotes a normalized angular frequency obtained as a result of a normalization process using the wavelength $\lambda 0$ of the flicker waveform.

Notation $\gamma m$ (where m=1, 2, 3 ...) denotes the amplitude of the flicker components for all orders (for all values of m). Notation $\phi m, n$ denotes the initial phase of the flicker components for all orders. The initial phase $\phi m, n$ is determined by the light emission period of 1/(100) seconds for the fluorescent lamp and the exposure timing. Since the initial phase $\phi m, n$ has the same value for every three fields, a difference in initial phase $\phi m, n$ from immediately preceding fields can expressed as follows:

$$\Delta\varphi m, n = -\frac{2\pi}{3} \times m \quad (3)$$

In the flicker reduction section 20 shown in FIG. 3, first of all, in order to reduce effects of a figure on detection of flickers, the integration section 111 integrates the input image signal In'(x, y) for every line, which is oriented in the horizontal direction of the screen, in order to compute an integration value Fn(y) for the line. However, the output integration value Fn(y) for a line is a value obtained as a result of a process to thin integration values for L lines to integration values for fixed L1 lines. It is to be noted that notation $\alpha_n(y)$ used in Eq. (4) is an integration value obtained by integration of the signal component Ln(x, y) along one line as expressed by Eq. (5).

$$\begin{aligned} Fn(y) &= \sum_x In'(x, y) \\ &= \sum_x ([1 + \Gamma n(y)] \times In(x, y)) \\ &= \sum_x In(x, y) + \Gamma n(y) \sum_x In(x, y) \\ &= \alpha_n(y) + \alpha_n(y) \times \Gamma n(y) \end{aligned} \quad (4)$$

where $$\alpha_n(y) = \Sigma In(x, y) \quad (5)$$

The integration value Fn(y) output by the integration section 111 is stored temporarily in the integration-value holding section 112 as a value used for later detection of flickers in later fields. The integration-value holding section 112 has a storage capacity capable of accommodating integration values of at least two fields.

By the way, if the object of photographing is uniform, the integration value $\alpha_n(y)$ obtained as a result of integrating the signal component In(x, y) is a constant. Thus, a flicker component $\alpha_n(y) \times \Gamma n(y)$ can be extracted with ease from the integration value Fn(y) obtained as a result of integrating the input signal component In'(x, y). In the case of an ordinary photographing object, however, the integration value $\alpha_n(Y)$ includes m×ω0 too. It is thus impossible to separate luminance and chrominance signals of the flicker component from respectively luminance and chrominance signals of the signal component of the photographing object itself. As a result, it is not possible to simply extract only the flicker component. In addition, since the flicker component serving as the second term in Eq. (4) is extremely small in comparison with the signal component serving as the first term, the flicker component is all but completely buried in the signal component.

Thus, in order to eliminate the effect of the integration value $\alpha_n(y)$ from the integration value Fn(y), the flicker reduction section 20 uses integration values for three successive fields. To be more specific, in a process carried out in this embodiment to compute the integration value Fn(y), the flicker reduction section 20 also reads out an integration value Fn_1(y) of the same line in the immediately preceding field and an integration value Fn_2(y) of the same line in the field preceding the present field by two fields from the integration-value holding section 112, supplying the three integration values, i.e., the integration value Fn(y), the integration value Fn_1(y) and the integration value Fn_2(y), to the average computation section 113. The average computation section 113 computes the average value AVE [Fn(y)] of the integration value Fn(y), the integration value Fn_1(y) and the integration value Fn_2(y).

If the object of photographing can be assumed to be a photographing object remaining all but the same during a period corresponding to the three successive fields in this case, the integration values $\alpha_n(y)$ can also be regarded as the same value. Practically, this assumption does not raise any problem if the movement made by the object of photographing during this period is small. In addition, from the relation expressed by Eq. (3), the process to compute the average value AVE [Fn(y)] of the integration values for the three successive fields sums up signals having the flicker component phases thereof sequentially shifted from each other by (−2π/3)×m. Thus, as a result, the flicker components cancel each other. Accordingly, the average value AVE [Fn(y)] can be expressed by Eq. (6) as follows.

$$\begin{aligned} AVE[Fn(y)] &= \frac{1}{3}\sum_{k=0}^{2} Fn\_k(y) \\ &= \frac{1}{3}\left\{\sum_{k=0}^{2} \alpha_{n\_k}(y) \times \Gamma n\_k(y)\right\} \\ &= \frac{1}{3}\sum_{k=0}^{2} \alpha_{n\_k}(y) + \frac{1}{3}\sum_{k=0}^{2} \alpha_{n\_k}(y) \times \Gamma n\_k(y) \\ &= \alpha_n(y) + \frac{1}{3}\alpha_n(y)\sum_{k=0}^{2} \Gamma n\_k(y) \\ &= \alpha_n(y) \end{aligned} \quad (6)$$

where $\alpha_n(y) \approx \alpha_{n\_1}(y) \approx \alpha_{n\_2}(y)$ (7)

In the above description of the process to compute the average value AVE [Fn(y)] of the integration values for the three successive fields, however, it is assumed that the approximation expressed by Eq. (7) holds true. If the movement of the photographing object is large, on the other hand, the approximation expressed by Eq. (7) no longer holds true. In the case of a large movement made by the object of photographing, however, the number of successive fields related to the process to compute the average value AVE [Fn(y)] of their integration values can be set at a multiple of 3 so as to reduce effects of the movement by making use of the effect of a low-pass filter in the time-axis direction.

The flicker reduction section 20 shown in FIG. 3 has a configuration assuming that the approximation expressed by Eq. (7) holds true. The embodiment further has a difference computation section 114 for computing a difference between the integration value Fn(y) received from the integration section 111 as the integration value for the present field and the integration value Fn_1(y) read out from the integration-value holding section 112 as the integration value for the a field immediately preceding the present field in accordance with Eq. (8) expressing a difference (Fn(y)−Fn_1(y)). It is to be noted that Eq. (8) is also based on the assumption that the approximation expressed by Eq. (7) holds true.

$$\begin{aligned} Fn(y) - Fn\_1(y) &= \{\alpha_n(y) + \alpha_n(y) \times \Gamma n(y)\} - \\ &\quad \{\alpha_{n\_1}(y) + \alpha_{n\_1}(y) \times \Gamma n\_1(y)\} \\ &= \alpha_n(y) \times \{\Gamma n(y) - \Gamma n\_1(y)\} \end{aligned} \quad (8)$$

-continued $$= \alpha_n(y)\sum_{m=1}^{\infty} \Upsilon m \times \{\cos(m \times \omega 0 \times y + \Phi m, n) - \cos(m \times \omega 0 \times y + \Phi m, n\_1)\}$$

Then, in the flicker reduction section 20 shown in FIG. 3, the normalization section 115 normalizes the difference (Fn(y)−Fn_1(y)) received from the difference computation section 114 by dividing the difference (Fn(y)−Fn_1(y)) by the average value AVE [Fn(y)] received from the average computation section 113.

The normalized difference value gn(y) is expanded into Eq. (9), which is expressed on the basis of Eqs. (6) and (8) in the form of a sum of products each expressed in terms of trigonometric functions. By further introducing the expression of Eq. (3) as a substitute for the factor (φm, n) in Eq. (9), Eq. (10) is obtained. It is to be noted that the factors |Am| and θm used in Eq. (10) are expressed by Eqs. (11) and (12) respectively.

$$gn(y) = \frac{Fn(y) - Fn\_1(y)}{AVE[Fn(y)]} \qquad (9)$$

$$= \sum_{m=1}^{\infty} \gamma m \times \{\cos(m \times \omega 0 \times y + \Phi m, n) - \cos(m \times \omega 0 \times y + \Phi m, n\_1)\}$$

$$= \sum_{m=1}^{\infty} (-2\gamma m \times \{\sin((m \times \omega 0 \times y + \frac{\Phi m, n + \Phi m, n\_1}{2}) \times \sin(\frac{\Phi m, n - \Phi m, n\_1}{1})\}$$

$$gn(y) = \sum_{m=1}^{\infty} \left(-2\gamma m \times \sin\left(m \times \omega 0 \times y + \Phi m, n + m \times \frac{\pi}{3}\right) \times \sin\left(-m \times \frac{\pi}{3}\right)\right) \qquad (10)$$

$$= \sum_{m=1}^{\infty} 2 \times \gamma m \times \cos(m \times \omega 0 \times y + \Phi m, n + m \times \frac{\pi}{3} - \frac{\pi}{2}) \times \sin\left(m \times \frac{\pi}{3}\right)$$

$$= \sum_{m=1}^{\infty} |Am| \times \cos(m \times \omega 0 \times y + \theta m)$$

$$\text{where } |Am| = 2 \times \gamma m \times \sin\left(m \times \frac{\pi}{3}\right) \qquad (11)$$

$$\theta m = \psi m, n + m \times \frac{\pi}{3} - \frac{\pi}{2} \qquad (12)$$

It is also worth noting that, since the effect of the signal intensity remains, in the difference Fn(y)−Fn_1(y), the levels of the luminance and chrominance changes caused by flickers vary from area to area. By normalizing the difference Fn(y)−Fn_1(y) as described above, however, the levels of the luminance and chrominance changes caused by flickers can be adjusted to the same level throughout all areas.

Notation |Am| used in Eq. (11) denotes the amplitude of the normalized difference value gn(y) for the order (m) of the spectrum. On the other hand, notation θm used in Eq. (12) denotes the initial phase of the normalized difference value gn(y) for the order (m) of the spectrum. If the normalized difference value gn(y) is subjected to a Fourier transformation process and attention is paid to the amplitude |Am| for the order (m) of the spectrum as well as initial phase θm for the order (m) of the spectrum in the result of the Fourier transformation process, the amplitude |Am| and initial phase φm, n used in Eq. (2) as the amplitude γm and initial phase φm,n of the flicker component for each order m can be expressed by Eqs. (13) and (14) respectively as follows:

$$\Upsilon m = \frac{|Am|}{2 \times \sin\left(m \times \frac{\pi}{3}\right)} \qquad (13)$$

$$\varphi m, n = \theta m - m \times \frac{\pi}{3} + \frac{\pi}{2} \qquad (14)$$

Then, in the DFT processing section 120 employed in the flicker reduction section 20 shown in FIG. 3, data corresponding to one period (or L1 lines) of the flicker waveform as data of the normalized difference value gn(y) output by the normalization section 115 is subjected to a DFT (discrete Fourier transformation) process. The one period of the flicker waveform corresponds to L1 lines.

In the following description, notation DFT [gn(y)] denotes the discrete Fourier transformation process applied to a normalized difference value gn(y) and notation Gn(m) denotes the result of the discrete Fourier transformation process DFT [gn(y)] of an order m. In this case, Eq. (15) holds true. Notation W used in Eq. (15) denotes the expression of Eq. (16). By setting the length of data subjected to the DFT process at one period of the flicker waveform as described above, a discrete spectrum group of a multiple of the normalized angular frequency ω0 can be found directly. Thus, the processing can be made simple. As described above, the one period of the flicker waveform corresponds to L1 lines.

$$DFT[gn(y)] = Gn(m) = \sum_{i=0}^{L-1} gn(i) \times W^{m \times i} \qquad (15)$$

where $$W = \exp\left[-j \times \frac{2\pi}{L}\right] \qquad (16)$$

The amplitude |Am| expressed by Eq. (11) and the initial phase θm expressed by Eq. (12) can be represented by respectively Eqs. (17) and (18) in terms of Gn(m), which denotes the result of the DFT process as indicated by Eq. (15), as follows:

$$|Am| = 2 \times \frac{|Gn(m)|}{L} \qquad (17)$$

$$\theta m = \tan^{-1}\left(\frac{\text{Im}(Gn(m))}{\text{Re}(Gn(m))}\right) \qquad (18)$$

where Im (Gn(m)) is the imaginary part of (Gn(m)) while Re (Gn(m)) is the real part of (Gn(m)).

Thus, from Eqs. (13), (14), (17) and (18), the amplitude γm and initial phase φm, n of the flicker component can be found in accordance with Eqs. (19) and (20) as follows:

$$\Upsilon m = \frac{|Gn(m)|}{L \times \sin\left(m \times \frac{\pi}{3}\right)} \qquad (19)$$

-continued $$\varphi m, n = \tan^{-1}\left(\frac{\text{Im}(Gn(m))}{\text{Re}(Gn(m))}\right) - m \times \frac{\pi}{3} + \frac{\pi}{2} \quad (20)$$

First of all, the DFT processing section 120 extracts a spectrum by carrying out a DFT process, the result of which is defined by Eq. (15), and then infers the amplitude γm and initial phase φm, n of the flicker component for each order in accordance with Eqs. (19) and (20).

It is to be noted that, in general, the Fourier transformation in the digital signal processing is the FFT (Fast Fourier Transform). Since the data length in the FFT needs to be the second power of a number, however, in this embodiment, a frequency analysis based on the DFT process is carried out to make the processing simple by a processing amount corresponding to the difference between the FFT process and the DFT process. In the actual illumination of a fluorescent lamp, even by limiting the orders m only to several values of the order, the flicker component can be approximated sufficiently. Thus, it is not necessary to output all data in the DCT process. As a result, from the processing-efficiency point of view, there is no demerit in comparison with the FFT process.

Then, the flicker generation section 130 carries out processing according to Eq. (2) by using the amplitude γm and the initial phase φm,n, which are inferred by the DFT processing section 120, in order to find the flicker coefficient Γn(y) correctly reflecting the flicker component. It is to be noted that, also in the case of the processing according to Eq. (2), by setting the upper limit of the summation at a value determined in advance in place of the infinity in the actual illumination of a fluorescent lamp, the flicker component in the practical application can be approximated sufficiently. To put it concretely, the upper limit of the summation can be set at 2 for example to eliminate processing for high orders m.

By the way, Eq. (1) can be changed to Eq. (21). On the basis of Eq. (21), the processing section 140 can find a signal component In(x, y) from an input signal component In' (x, y) with the flicker component suppressed. To put it concretely, the processing section 140 adds 1 to the flicker coefficient Γn(y) to result in a sum and divides the input signal component In' (x, y) by the sum to provide the signal component In(x, y).

$$\text{In}(x,y) = \text{In}(x,y) / [1 + \Gamma n(y)] \quad (21)$$

In accordance with the processing to detect and reduce flickers as described above, even in an area where a flicker component is buried completely in a signal component, for every integration value Fn(y), a difference (Fn(y)−Fn_1(y)) is computed and normalized by dividing the difference by an average value AVE [Fn(y)] so as to detect the flicker component with a high degree of precision. An example of such an area is an area in which the flicker component forms a subtle black background or a portion with a low degree of illumination.

In addition, in the process to compute the flicker coefficient Γn(y), the number of orders can be limited to a value determined in advance. Thus, the flicker component can be detected with a high degree of precision by carrying out relatively simple processing. It is to be noted that the process to infer a flicker component from a spectrum of up to a suitable order value allows the flicker component to be approximated without reproducing the normalized difference value gn(y) completely. Thus, even if a discontinuous portion is generated in the normalized difference value gn(y) in dependence on the state of the photographing object, the flicker component of the portion can rather be inferred with a high degree of precision.

It is to be noted that, in the processing described above, the difference (Fn(y)−Fn_1(y)) is normalized by dividing the difference by an average value AVE [Fn(y)] so as to allow finite computation precision to be assured effectively. However, if the requested computation precision can be met, for example, the integration value Fn(y) can also be normalized directly by using the average value AVE [Fn(y)].

In addition, the normalization process can also be carried out by using the integration value Fn(y) in place of the average value AVE [Fn(y)]. In this case, even if the flicker waveform does not exhibit the repetitive characteristic for every plurality of screens due to a relation between the period of the flicker waveform and the screen rate, flickers can be detected and the number of flicker components can be reduced.

<Problems of the Thinning Process>

Next, a process to thin sampling data in the flicker reduction section 20 is explained. The sampling data is integration values generated by the integration section 111.

In the flicker reduction section 20 shown in FIG. 3, in order to find an average value, integration values Fn(y) output by the integration section 111 for at least two fields are stored in the integration-value holding section 112. The storage capacity of the integration-value holding section 112 must be increased in proportion to the number of integration values Fn(y) to be stored therein. In addition, in the DFT processing section 120, the amount of processing and the number of parameters (such as twiddle factors) required in the processing increase substantially in accordance with the number of data points used in the processing. It is obvious that the size of the processing circuit and the required processing power rise as the number of sampling points increase regardless of whether the DFT processing is carried out by using hardware or by execution of software. Thus, from the system-scale point of view, it is desirable to handle a small number of sampling points in the integration section 111.

From the standpoint of the flicker detection precision, on the other hand, the larger the number of sampling points, the higher the degree of precision with which the signal processing can be carried out. Even if the flicker detection method described above is adopted, a larger number of sampling points is still required to carry out the signal processing with a higher degree of precision. In actuality, however, the frequency of the flicker waveform for sampling intervals corresponding to a sampling process carried out for every line is sufficiently small. Thus, if the sampling theorem is taken into consideration, sampling data points of L points corresponding to one period of the flicker waveform are redundant. In particular, the value of M representing the number of lines of an image-pickup device employed in a contemporary image-pickup apparatus is a value of the order of several hundreds to several thousands. Thus, the value of L representing the number of lines corresponding to one period of the flicker waveform is a value of the same order. On the other hand, if an image is taken by using the NTSC system having a field frequency of 60 Hz in the illumination of a fluorescent lamp driven by a commercial alternating-current power supply with a frequency of 50 Hz, the flicker waveform results in 1.666 stripes on a screen. In the case of the flicker detection process described above, if one period of the flicker waveform can be sampled as several tens of points, sufficient detection precision can be obtained. For example, 64 points will provide sufficient detection precision.

For the reason described above, the integration section 111 thins the sampling data of L lines output by the line integrator 210 to output sampling data of L1 points where L>>L1. Naturally, however, the larger the value of L1, the higher the degree of the flicker detection precision. It is thus desirable to select the largest possible value of L1 in the tolerance range of the installation area of the processing circuit and the tolerance range of the manufacturing cost.

Next, problems raised in the process to thin sampling data are explained. Let us consider a relation between the number of sampling points and the detection precision from the standpoint of the flicker detection algorithm described above.

As a general property of the DFT process, it is known that a discrete spectrum array appearing in a DFT process carried out on a data array obtained as a result of a process to sample any waveform at X points corresponds to components of orders m for a case in which the sampling waveform is subjected to a Fourier series expansion process taking a sinusoidal waveform (cosine waveform) with a period consisting of the X points as a fundamental wave corresponding to the order m of 1.

Let us consider a case in which integration values output by the line integrator 210 of the integration section 111 for L lines are supplied to the next stage as they are. In this case, the DFT processing section 120 carries out a DFT process by taking the sampling data of L points as one period. Then, the flicker generation section 130 infers a flicker waveform by using spectra of terms of low orders. For example, only spectra of terms of the orders m=1 and 2 are used. That is to say, in this embodiment, the L lines corresponding to one period of the flicker waveform are sampled at L points. Thus, each of the spectra produced by the DFT process as spectra of orders m can be said to correspond to a component of the order m for a case in which the flicker waveform is subjected to a Fourier series expansion process taking a sinusoidal waveform with a period equal to one period of the flicker waveform as it is. Accordingly, by merely extracting a spectrum array of a proper order m and expressed in terms of substances of the Fourier series expansion, the flicker waveform can be inferred with ease and with a high degree of precision.

Let us consider a case in which sampling data is thinned with such a flicker detection algorithm. FIG. 4 is an explanatory diagram to be referred to in describing a typical process to thin sampling data.

Figure 4A:
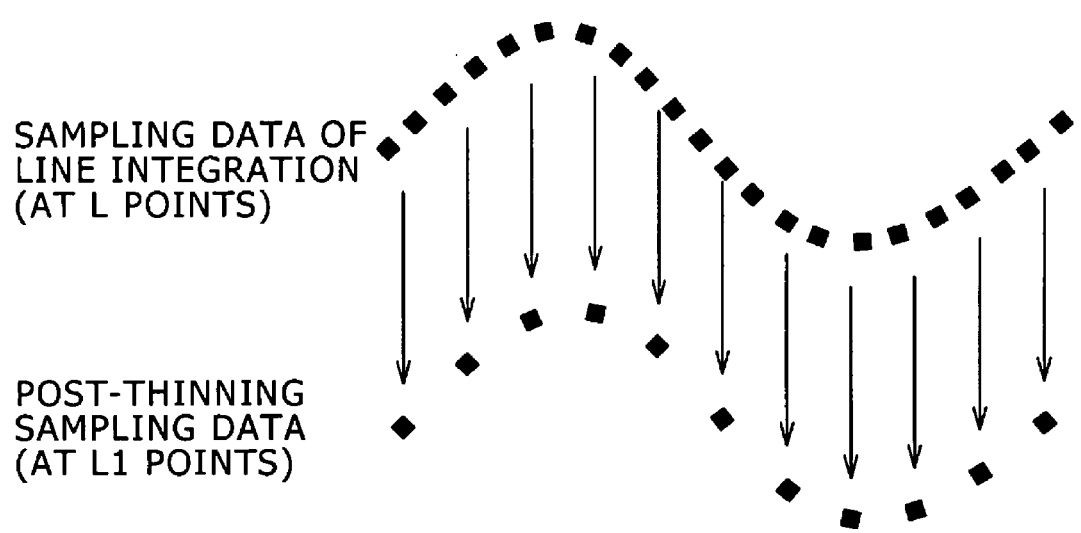
FIGS. 4A and 4B are explanatory diagrams to be referred to in describing a typical process to thin sampling data.
Figure 4B:
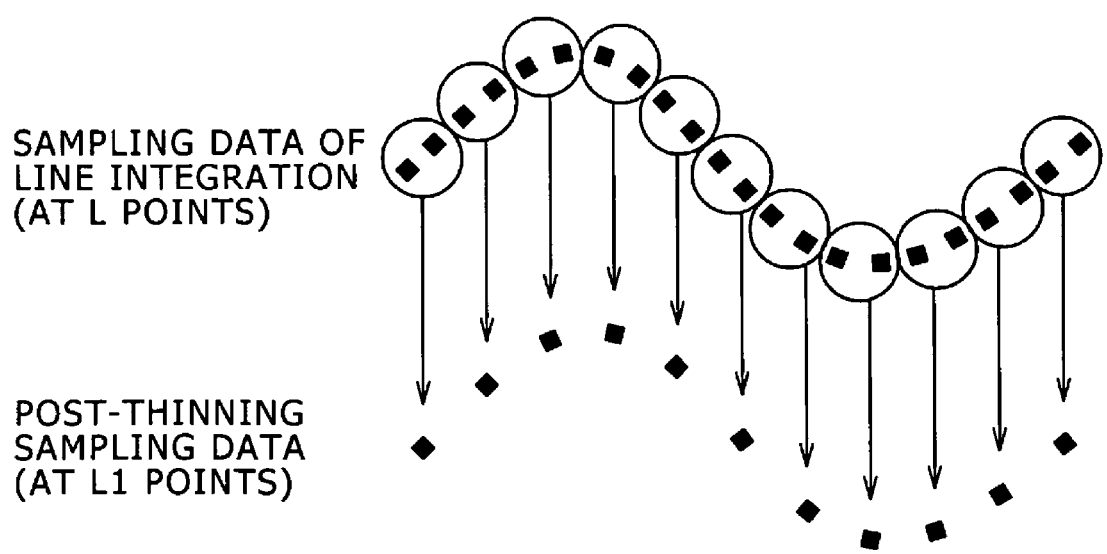

In the typical thinning process shown in FIG. 4, the number of data points is reduced to ½. In accordance with a technique shown in FIG. 4A, sampling data produced by a line integration process as pieces of data at L points is simply thinned in order to reduce the number of data points so that the size of the processing circuit and other quantities can be decreased. In accordance with a technique shown in FIG. 4B, on the other hand, new data is found from pieces of sampling data at a plurality of points by carrying out an LPF process. Since the frequency of the flicker waveform is sufficiently smaller than a frequency corresponding to a sampling interval between lines, even if an averaging process is carried out as a typical LPF process, the process rather contributes to suppression of noise components without making the flicker waveform to be detected dull so that an effect of increasing the detection precision can be obtained.

However, the flicker detection algorithm described above is based on a presumption that that a sampling process is carried out with a high degree of accuracy during a period corresponding to one period of the flicker waveform. Thus, as will be described below, there are cases in which the detection precision deteriorates unavoidably in dependence on conditions.

Figure 5:
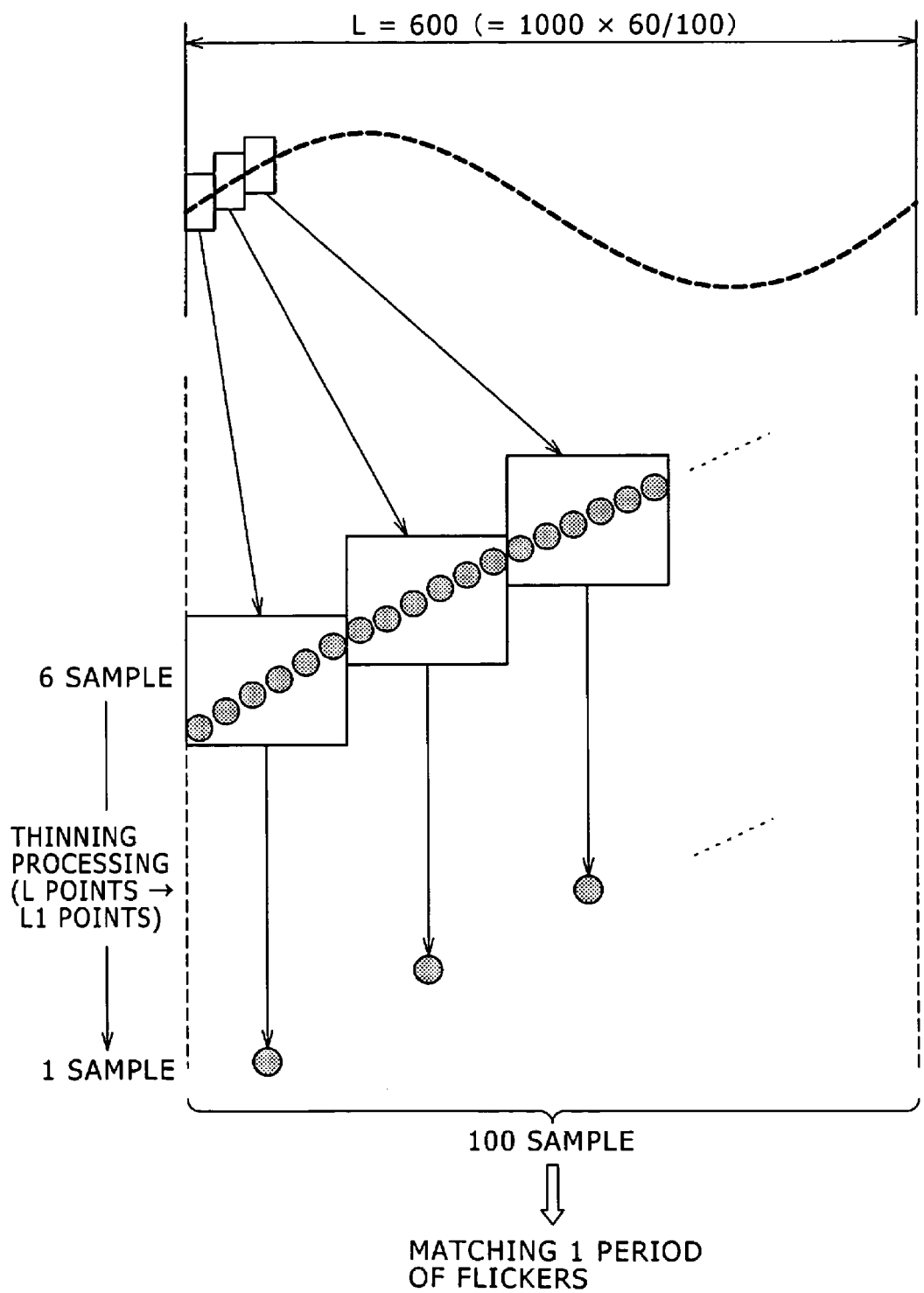
FIG. 5 is a diagram showing a model of the state of a thinning process carried out for a case in which the sampling period matches one period of the flicker waveform.

FIG. 5 is a diagram showing a model of the state of a thinning process carried out for a case in which the sampling period matches one period of the flicker waveform.

In the processing carried out by the system as processing represented by the model shown in FIG. 5, the value of M representing the number of lines in 1 field is 1,000 and a tolerated value of L1 representing the number of sampling points output by the integration section 111 as the number of sampling points per field is 100. In this case, the value of L representing the number of lines is 1,000×60/100=600. Thus, in order to thin data of the L lines into data of L1 points tolerated by the system, a data thinning unit D is set at 6 (=L/L1) without regard to the type of the thinning process. Accordingly, by setting the thinning unit D at 6 in a thinning process to reduce the number of data points from L to L1, one period of the flicker waveform can be sampled with a high degree of accuracy by making use of data at all the L1 (=100) points tolerated by the system. Therefore, by adopting the flicker detection algorithm described above, a flicker detection process can be carried out with a high degree of precision. An example of the data at all the L1 (=100) points is data stored in a memory area specially assigned to the data.

Figure 6:
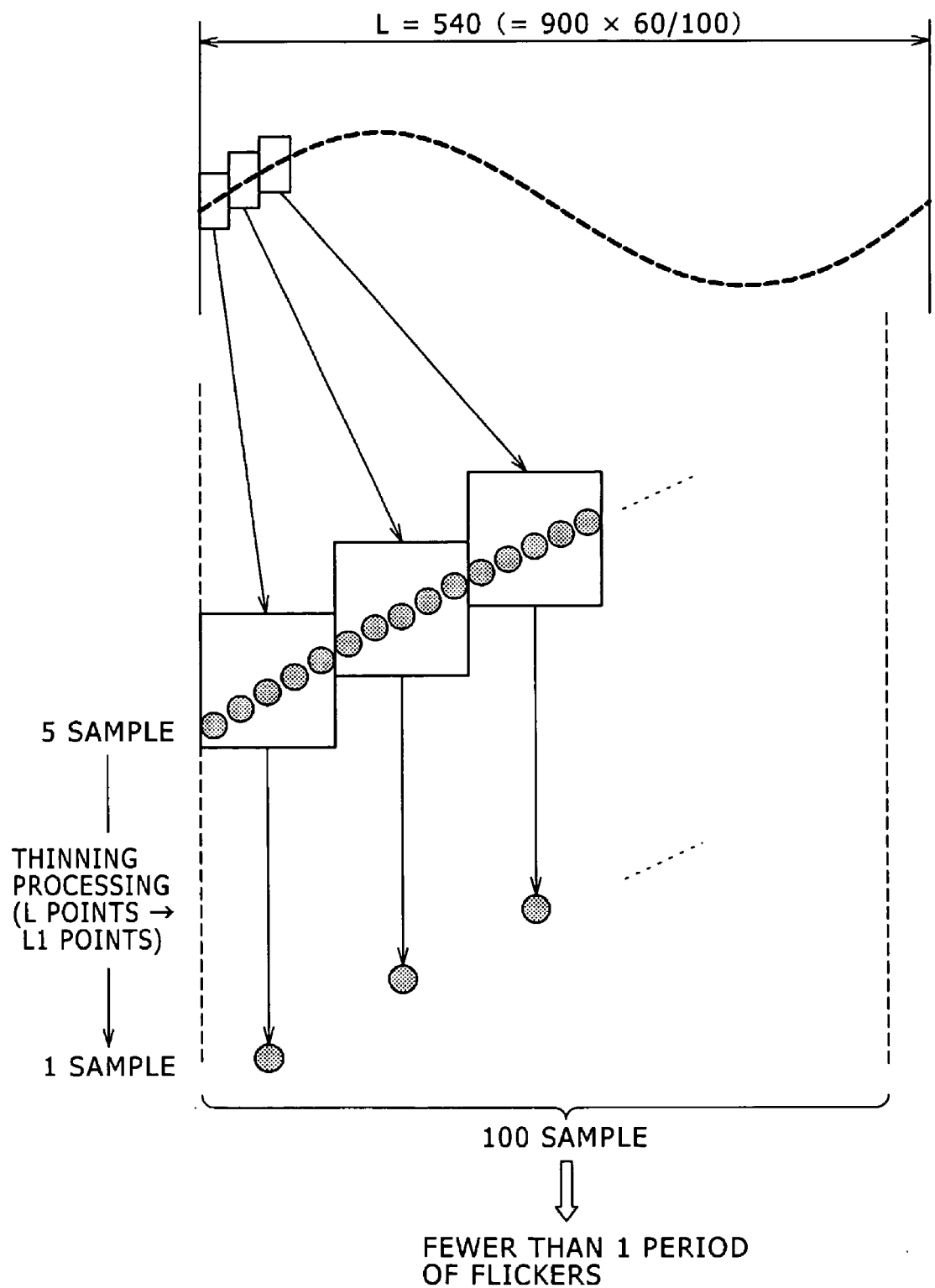
FIG. 6 is a diagram showing a model of the state of a thinning process carried out for a case in which the sampling period is shorter than one period of the flicker waveform.
Figure 7:
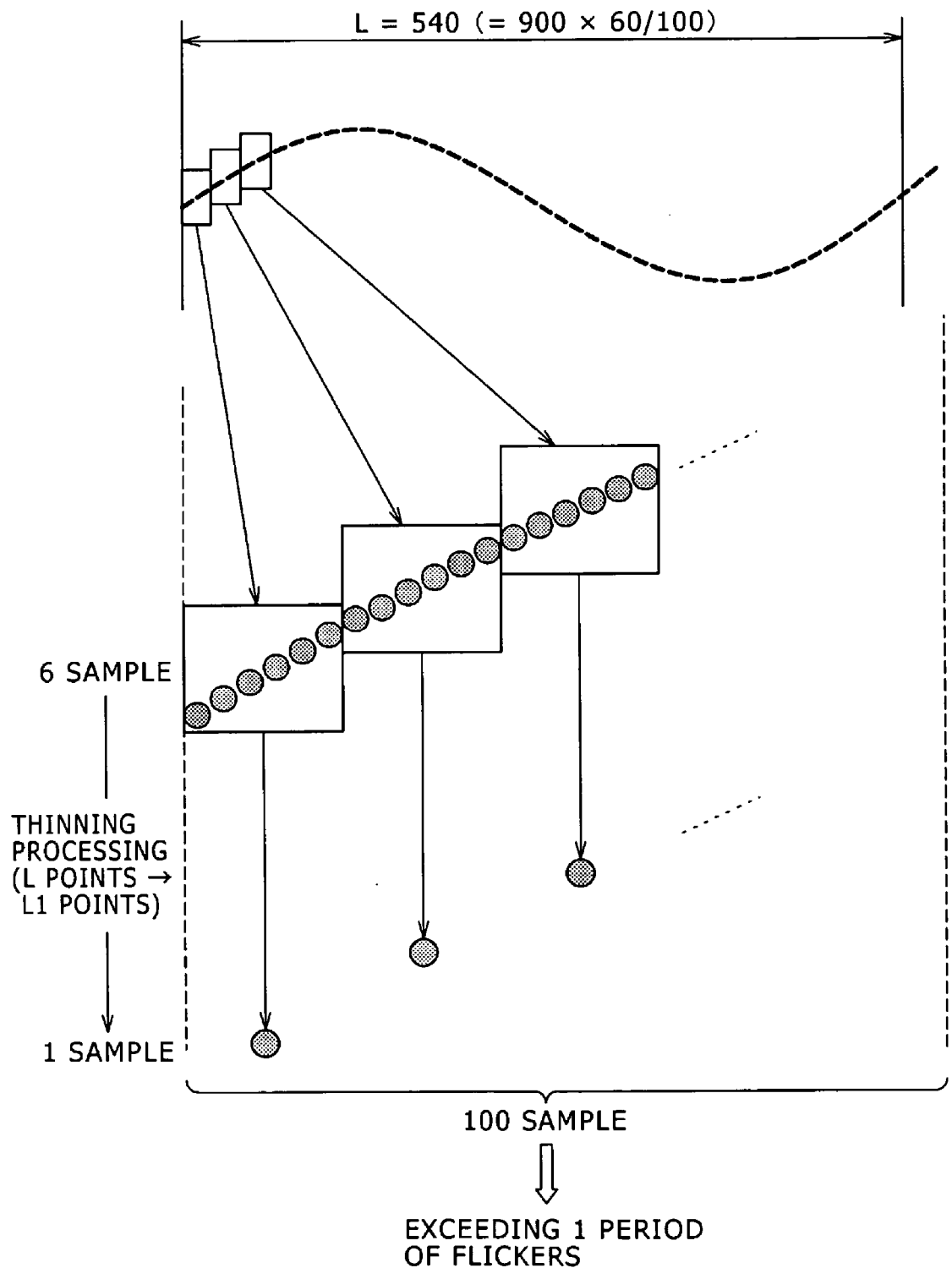
FIG. 7 is a diagram showing a model of the state of a thinning process carried out for a case in which the sampling period is longer than one period of the flicker waveform.
Figure 8:
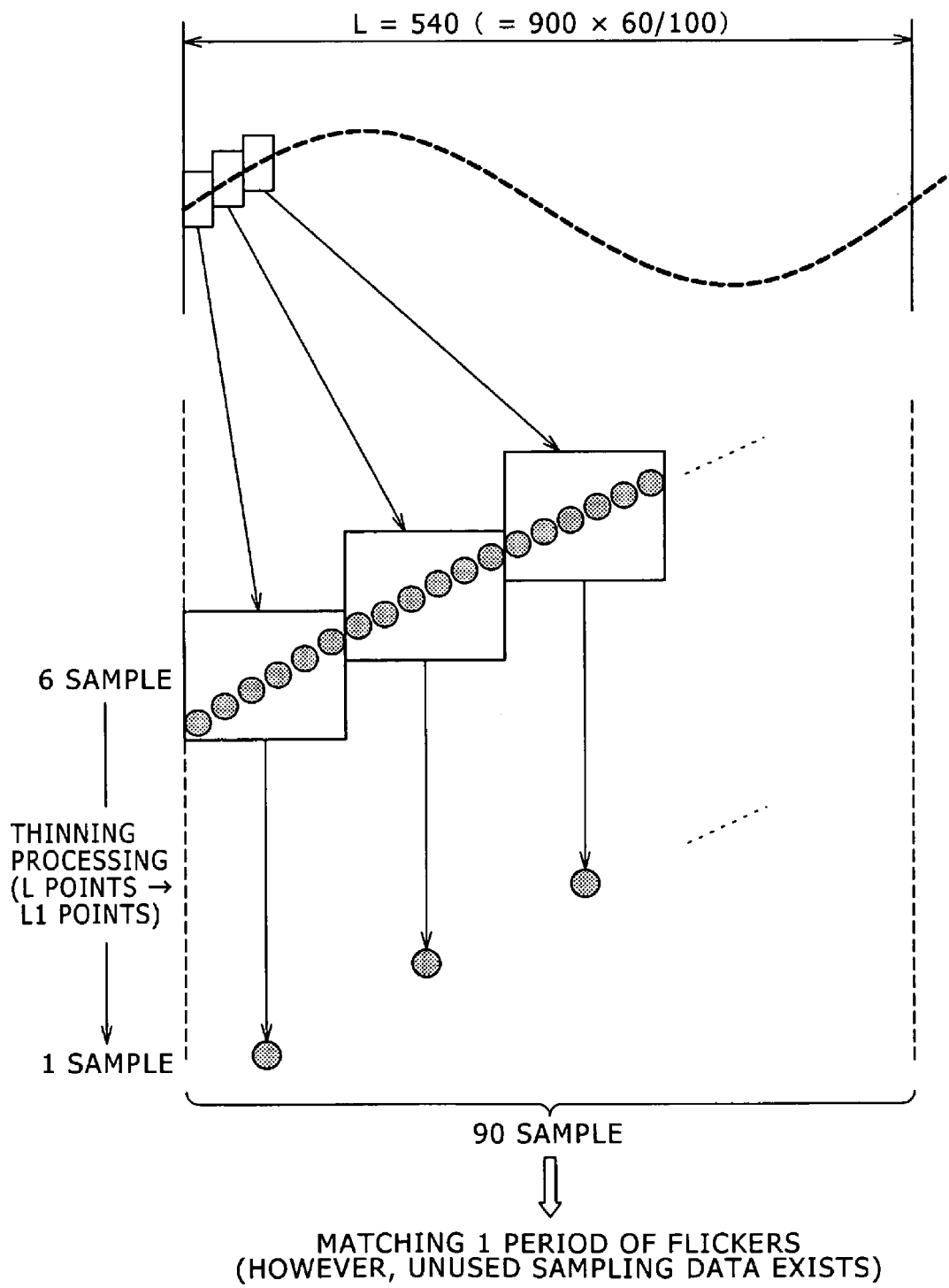
FIG. 8 is a diagram showing a model of the state of a thinning process carried out for a case in which the number of data points to be used is reduced so that the sampling period matches one period of the flicker waveform.

On the other hand, by referring to FIGS. 6 to 8, the following description explains a case in which the value of M representing the number of lines in one field is 900 and the value of L1 representing the number of points tolerated by the system is sustained at 100 as it is.

FIG. 6 is a diagram showing a model of the state of a thinning process carried out for a case in which the sampling period is shorter than one period of the flicker waveform. FIG. 7 is a diagram showing a model of the state of a thinning process carried out for a case in which the sampling period is longer than one period of the flicker waveform. FIG. 8 is a diagram showing a model of the state of a thinning process carried out for a case in which the number of data points to be used is reduced so that the sampling period matches one period of the flicker waveform.

If the value of M representing the number of lines in 1 field is 900, the value of L representing the number of lines is 900×60/100=540. In this case, in order to thin data of the L lines into data of L1 points tolerated by the system, a data thinning unit D must be set at 5.4 (=L/L1) without regard to the type of the thinning process.

However, it is necessary to set the data thinning unit D at an integer. Thus, as shown in FIG. 6, the data thinning unit D is typically set at 5, which is an integer closest to the calculated value of the data thinning unit D. In this case, however, the sampling period includes only 500 (=5×100) lines even if all pieces of sampling data at all the L1 points tolerated by the system are output. Thus, one period of the flicker waveform cannot be sampled. If the data thinning unit D is typically set at 6 as shown in FIG. 7, on the other hand, in order to sample all the L1 points tolerated by the system, 600 (=6×100) lines will be sampled inevitably. In this case, a later process is carried out by using pieces of sampling data of a period exceeding one period of the flicker waveform.

If the data thinning unit D is typically set at 6 and the value of L1 representing the number of sampling points after the thinning process is set at 90, a period of the flicker waveform can be sampled with a high degree of accuracy as shown in FIG. 8. In this case, however, the utilization of only 90 points in spite of a large memory area is inefficient because the memory area is typically provided for 100 sampling data points tolerated by the system. In anticipation of the use of only 90 points among the 100 points that can be accommodated in such memory area, a system capable of processing only data of 90 points can of course be constructed in advance. However, such a system will unavoidably limit the number of pixels composing the image-pickup device that can be incorporated in the system, inevitably losing the versatility. In addition, in general, it is difficult to adjust the thinning unit D in a good combination with the value of L1 representing the number of sampling points so as to accurately sample a period of the flicker waveform.

Figure 9:
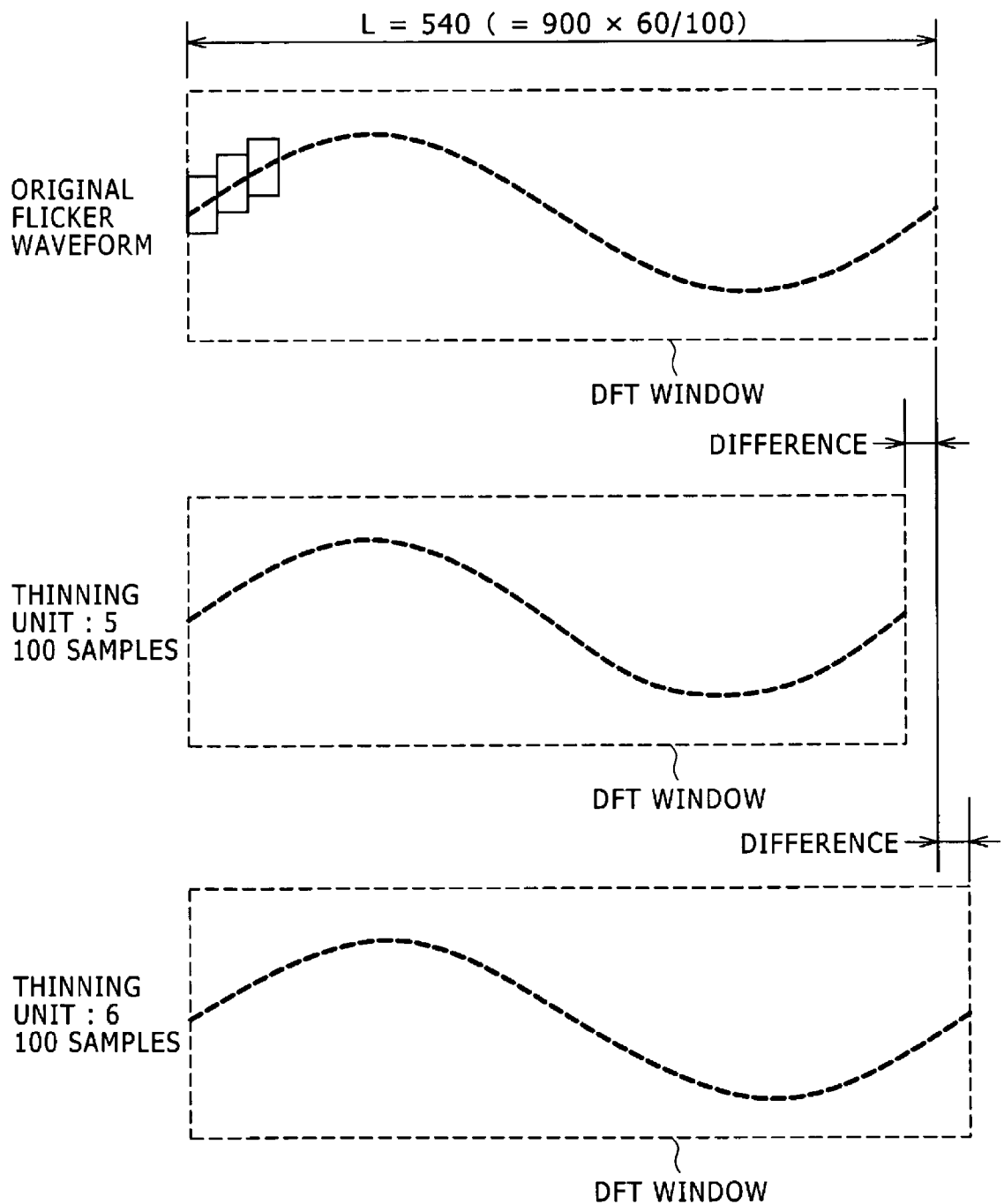
FIG. 9 is explanatory diagrams referred to in describing a thinning process carried out for a case in which the sampling period does not match one period of the flicker waveform.

FIG. 9 is explanatory diagrams referred to in describing a thinning process carried out for a case in which the sampling period does not match one period of the flicker waveform.

As described earlier, since a spectrum array obtained by the DFT processing section 120 placed at a later stage corresponds to components of orders in the case of a Fourier series expansion process taking a sinusoidal waveform with a period of sampling period, if the sampling period does not match one period of the flicker waveform as described above, the obtained flicker array can no longer be said to be an array obtained as a result of an expansion by one period of flickers.

If one period of the flicker waveform can be sampled as shown in the upper-side diagram of FIG. 9, the so-called DFT window shown as a dashed-line frame in the middle diagram matches the one period of the flicker waveform and the DFT processing section 120 carries out a Fourier transformation process under the assumption that the waveform inside the dashed-line frame is an infinitely repeated signal. That is to say, the signal inside the window is expanded along a frequency axis with a spectrum array of a sinusoidal wave taking the DFT window as one period.

If the sampling period is shifted away from the one period of the flicker waveform as shown in the lower-side diagram of FIG. 9, on the other hand, the size of the DFT window is much different and the DFT processing section 120 carries out a Fourier transformation process under the assumption that the waveform inside each dashed-line frame is an infinitely repeated signal. Thus, a spectrum array obtained in such a process is different from that obtained as a result of a Fourier series expansion process taking a sinusoidal waveform with a period of the conventional flicker waveform. With the flicker detection algorithm described above, if the sampling period does not match the one period of the flicker waveform as described above, a detection error proportional to the magnitude of the shift is generated.

As a conceivable method to avoid this problem, the value of L1 representing the number of sampling points is increased. In this case, however, the larger the value of L1, the larger the size of the system. By cleverly selecting a combination of the value of L1 representing the number of sampling points and the thinning unit D, nevertheless, the problem described above can be solved to a certain degree. However, there is not necessarily a solution suitable for all of a plurality of sensor variations that may be adopted by the system. Thus, there may be variations in performance in some cases. The number of sensor variations is equal to M, which represents the number of lines in a field.

On top of that, the flicker detection algorithm described above also has a problem of setting of twiddle factors required in the DFT process. The DFT process generally requires a sinusoidal wave or a cosine wave known as a twiddle factor, the phase of which must normally match the phase of every sampling data. It is to be noted that, in order to detect a high-order term, a twiddle factor according to the order of the term is also required.

Let us assume for example that a system can be adapted to a plurality of sensor variations. In this case, even if a combination of the thinning unit D and the Value of L1 closest to a period is selected for every sensor, the DFT process requires a circuit factor suitable for each sensor. It is thus necessary to set the circuit factors in the DFT processing section 120 as typically a ROM table or acquire the circuit factors through communication. Accordingly, if a new sensor is added, all the detection orders must be provided separately. As a result, from the system-size and development-cost points of view, there is raised a big problem in practical applications.

<First Typical Configuration of the Integration Section>

Figure 10:
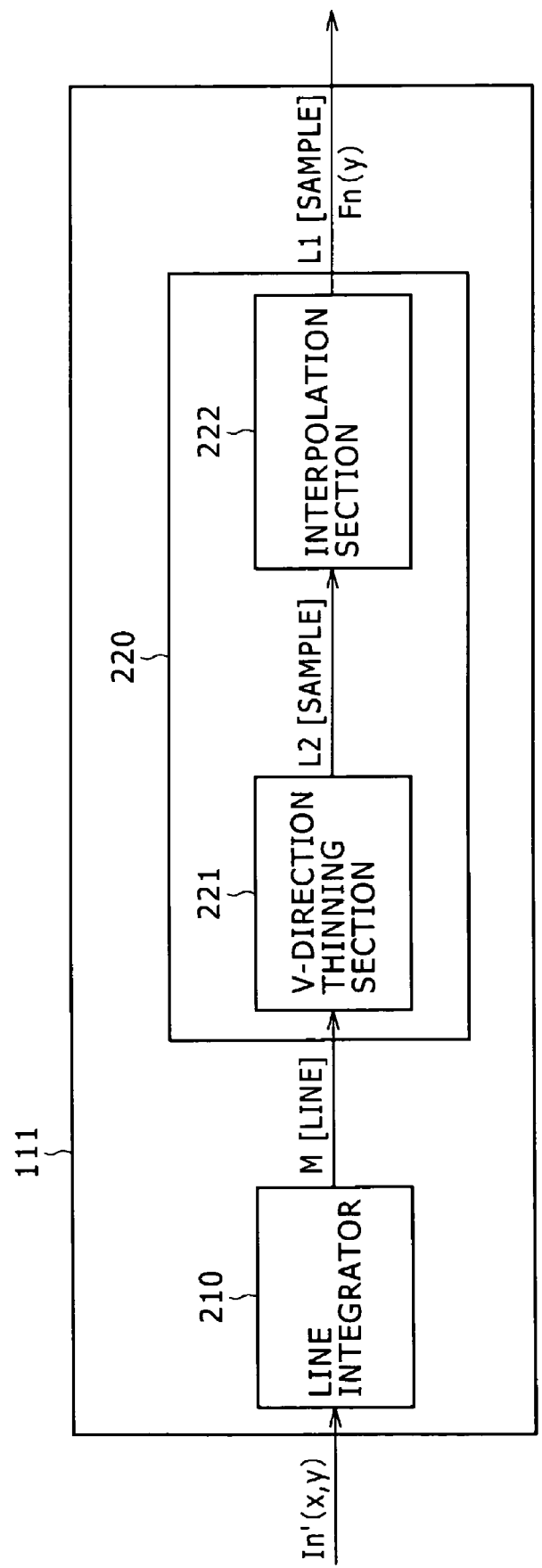
FIG. 10 is a block diagram showing a first typical configuration of an integration section.

FIG. 10 is a block diagram showing a first typical configuration of the integration section.

As described earlier, the integration section 111 shown in FIG. 10 includes a line integrator 210 and a thinning section 220, which has a V-direction thinning section 221 and an interpolation section 222.

The line integrator 210 integrates an input image signal in line units and supplies integration values of the entire screen or integration values of M lines in a field to the thinning section 220. The V-direction thinning section 221 employed in the thinning section 220 carries out a thinning process taking a fixed thinning unit in order to reduce the number of data points for the integration values each received for a line from M corresponding to a field to L2. The V-direction thinning section 221 may typically adopt the LPF thinning method to be described later as a thinning technique. It is to be noted that, instead of carrying out the formal thinning process, the V-direction thinning section 221 may perform a simple thinning process by merely outputting a piece of data for every predetermined number of pieces of input data. In this case, V-direction thinning section 221 carries out the simple thinning process by controlling simple integration timings. Thus, the circuit configuration can be simplified. On the basis of L2 points resulting from the thinning process as points of sampling data, the interpolation section 222 generates L1 points of sampling data by interpolation with a high degree of accuracy during a period of the flicker waveform.

Figure 11:
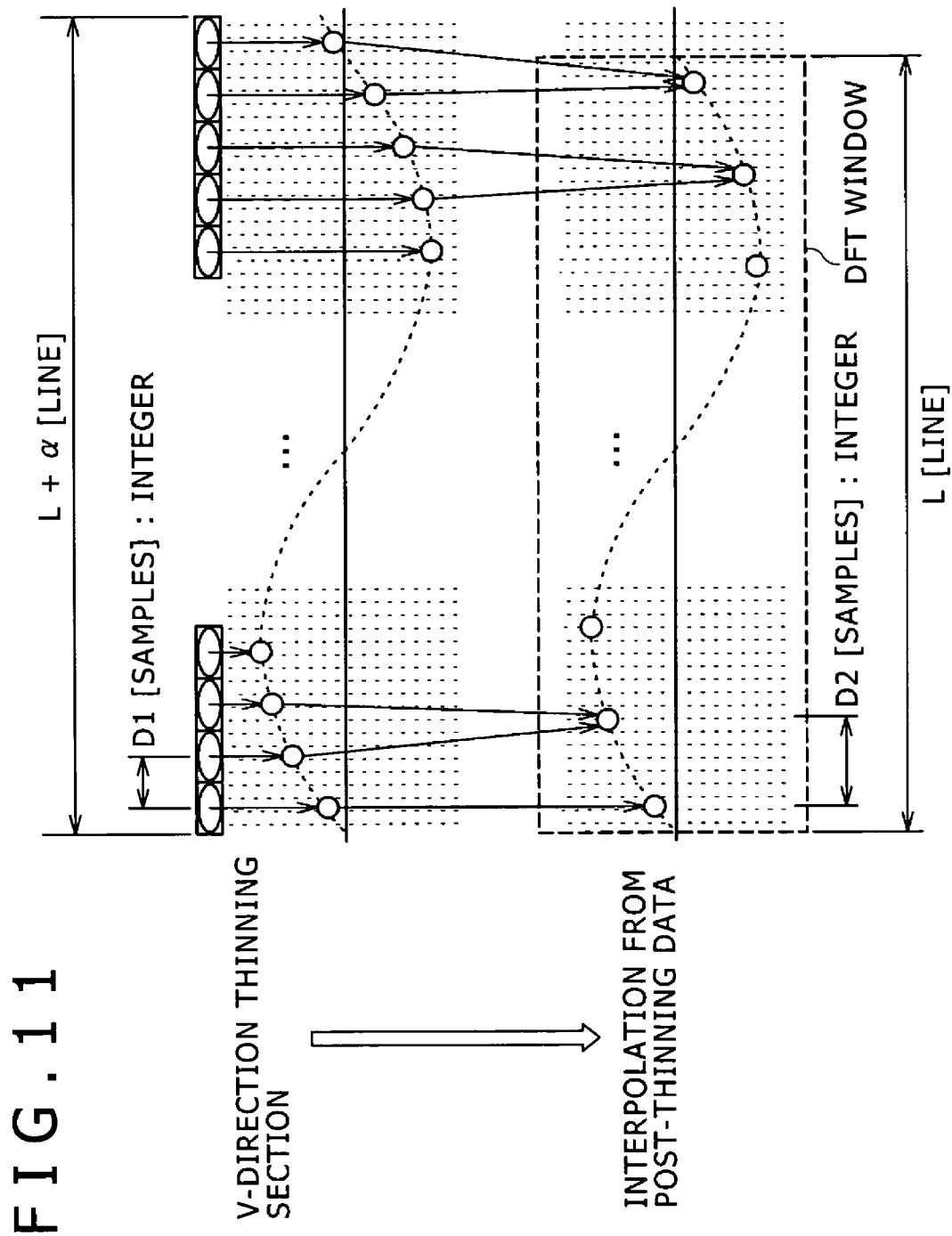
FIG. 11 is explanatory diagrams referred to in describing operations carried out by the integration section shown in FIG. 10.

FIG. 11 is explanatory diagrams referred to in describing operations carried out by the integration section 111 shown in FIG. 10.

The upper-side diagram of FIG. 11 shows a case in which the V-direction thinning section 221 carries out processing such as an LPF process utilizing integration values of D1 lines in order to output a piece of data. In this embodiment, D1 has the value of 4. At that time, the number of data points output as a result of the thinning process is L2, which is set at a value at least equal to L representing the number of lines corresponding to a period of the flicker waveform. That is to say, if L/L2 is not an integer due to the number of lines composing the image-pickup device employed in the video camera, L2 is set at a value at least equal to L so that L/L2 (=D1) becomes equal to an integer. In this way, a period having a length at least equal to a period of the flicker waveform can be sampled with a high degree of reliability.

It is to be noted that the V-direction thinning section 221 does not have to process and output all the L2 points concurrently. If the V-direction thinning section 221 has a configuration for processing the blocks one by one along the time axis, that is, if the V-direction thinning section 221 has a configuration for processing the input pieces of sampled data sequentially, the size of the processing circuit may change in accordance with the thinning unit D1 but the size of the processing circuit never increases due to a rising number of sampling points per line. Thus, even if the value of L2 exceeds the value of L, the size of the processing circuit never rises.

In addition, as shown in the lower-side diagram of FIG. 11, the interpolation section 222 carries out an interpolation process to newly generate pieces of output data at L1 sampling points, which match a period of the flicker waveform with a high degree of accuracy, from the pieces of data obtained as a result of the thinning process as the pieces of data at the L2 points. The value of L1 representing the number of sampling points is a value set to satisfy the sampling theorem sufficiently and produce the required detection precision. The value of L1 is a value in the range of tolerance set by the system. Typically, the value of L1 corresponds to the storage capacity of the integration-value holding section 112. L1 is set at a fixed value without regard to the value of M representing the number of lines composing the image-pickup device employed in the video camera. In consequence, in dependence on the value of M representing the number of lines composing the image-pickup device, L2/L1 (=D2) is not an integer for some cases. Even in such cases, however, the interpolation section 222 is capable of carrying out an interpolation process to generate pieces of output data at L1 sampling points with a high degree of reliability from the pieces of data at the L2 points.

Thus, since the DFT window in the DFT processing section 120 placed at the later stage can be adjusted to match a period of the flicker waveform, the flicker waveform can be inferred with a high degree of precision. In addition, since the period of the waveform is sufficiently long in comparison with the sampling interval, the interpolation process can be carried out as a linear interpolation process with a sufficiently high degree of detection precision.

Figure 12:
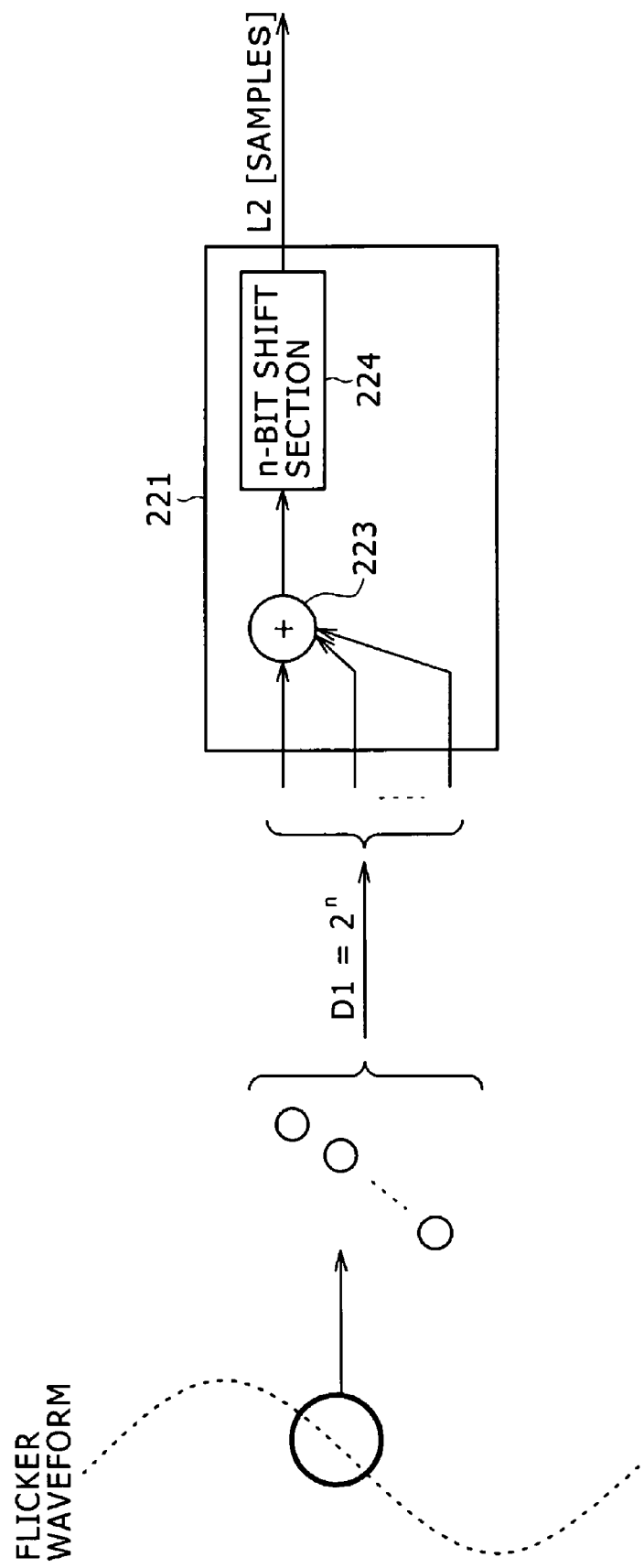
FIG. 12 is a diagram showing a typical internal configuration of a V-direction thinning section.

FIG. 12 is a diagram showing a typical internal configuration of the V-direction thinning section 221.

As described earlier, the thinning process carried out by the V-direction thinning section 221 can be a simple thinning process to merely output input data in an intermittent manner or a thinning process applying the LPF effect. The typical configuration shown in FIG. 12 is a configuration applying the LPF effect. If the thinning unit D1 is set at the nth power of 2 where n is a non-negative integer, as shown in FIG. 12, the V-direction thinning section 221 can be designed into a simple configuration having an adder 223 and an n-bit shift section 224. The adder 223 is a component for summing up integration values at D1 points. On the other hand, the n-bit shift section 224 is a component for shifting input data by n bits in the direction toward the less significant side.

In addition, even if the thinning unit D1 is not the nth power of 2, by always carrying out a process to sum up k pieces of data in the adder 223 where k is the nth power of 2 and sequentially shifting data supplied to the adder 223 by a distance equivalent to the thinning unit D1, the circuit configuration can be made simple even though the circuit configuration discards some of the data. In addition, the circuit configuration is capable of easily keeping up with a variety of image-pickup devices with a variety of line counts. Conversely speaking, if the circuit-area and manufacturing-cost constraints are lenient, the degree of detection precision can be raised through computation of a perfect average value by using the n-bit shift section 224 as a divider.

It is to be noted that, as described above, since the period of the waveform is sufficiently long in comparison with the sampling interval, even with the LPF configuration for carrying out an averaging process described above, the process rather contributes to suppression of noise components without making the flicker waveform to be detected dull so that it is possible to increase the detection precision and to make the circuit configuration simple at the same time.

In accordance with the flicker reduction section 20 employing the integration section 111 described above by referring to FIG. 10, a period of the flicker waveform is always sampled with a high degree of accuracy without constraints imposed by the number of pixels composing the image-pickup device employed in the video camera so that flickers can be detected and reduced. Thus, the flicker detection precision can be increased in a stable manner to reduce detection performance variations, which are caused by sensor variations. In addition, since twiddle factors required for the DFT process can each always be set at the same value, the flicker detection precision can be increased without increasing the size of the processing circuit including a memory used for storing parameters. In addition, since all pieces of sampling data at points tolerated by the system are used to carry out subsequent processes, the size of the processing circuit and the manufacturing cost can be prevented from increasing unnecessarily. The pieces of sampling data are pieces of data stored in the integration-value holding section 112.

In addition, the above effects can be obtained by merely changing the configuration of the integration section 111 slightly from the conventional flicker detection/reduction circuit having a size reduced by the process to thin sampling data. In addition, in an effort to optimize the circuit configuration and the control procedure for image-pickup devices with different pixel counts, only small changes need to be made to the circuit configuration and the control procedure. It is thus possible to implement a small-size processing circuit offering improved flicker detection performance and good versatility.

<Second Typical Configuration of the Integration sections

Figure 13:
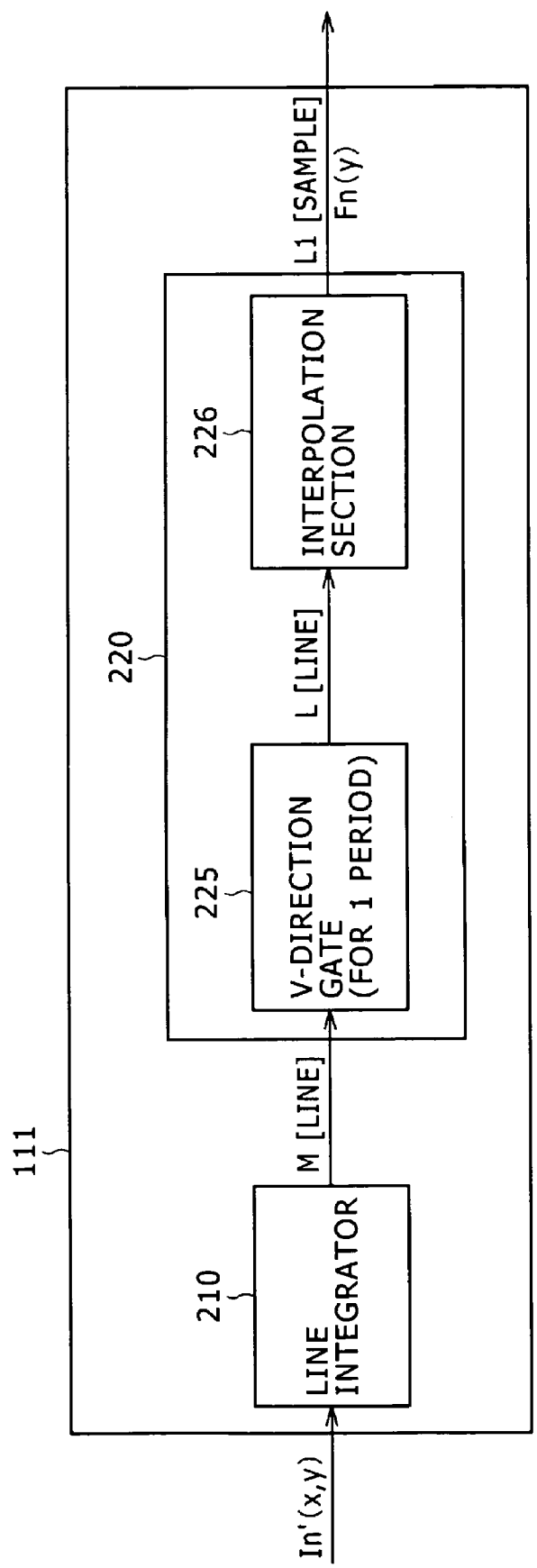
FIG. 13 is a block diagram showing a second typical configuration of the integration section.

FIG. 13 is a block diagram showing a second typical configuration of the integration section 111.

The integration section 111 shown in FIG. 13 is different from the integration section 111 shown in FIG. 10 in that the internal configuration of the thinning section 220 employed in the former integration section 111 is different from that employed in the latter integration section 111. That is to say, the thinning section 220 employed in the integration section 111 shown in FIG. 13 includes a V-direction gate 225 and an interpolation section 226.

The V-direction gate 225 is a component for receiving integration values obtained throughout the entire screen from the line integrator 210 and supplying only integration values of a minimum period required for sampling a period of the flicker waveform to the interpolation section 226 provided at the following stage. The minimum period is a period of L lines. During periods outside the minimum period, the operation to output integration values to the interpolation section 226 is stopped. By using the received integration values for the L lines, the interpolation section 226 carries out an interpolation process to generate pieces of sampling data at L1 points accurately corresponding to a period with a length equivalent to one period of the flicker waveform. The interpolation section 226 has a configuration for directly generating the pieces of sampling data at L1 points by carrying out an interpolation process on results of line integration. Thus, in comparison with the first embodiment for generating sampling data by carrying out a conversion process through two stages, the performance to detect the flicker waveform can be improved.

Figure 14:
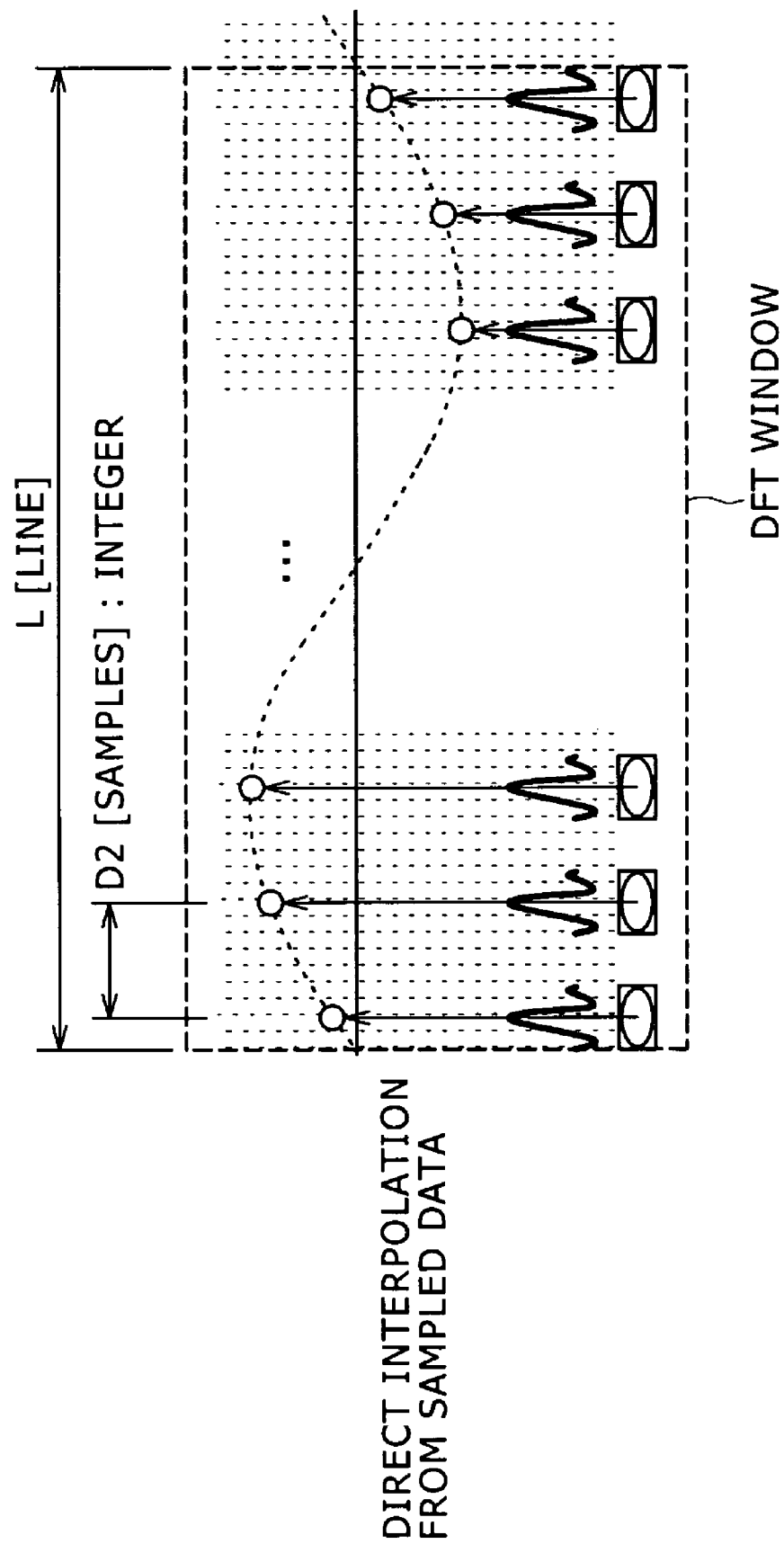
FIG. 14 is explanatory diagrams referred to in describing operations carried out by the integration section shown in FIG. 13.

FIG. 14 is an explanatory diagram referred to in description of operations carried out by the integration section 111 shown in FIG. 13.

Since the period of the flicker waveform is sufficiently long in comparison with the sampling interval, the interpolation process carried out by the interpolation section 226 is a general process using a proper interpolation function to sustain the required sufficient detection precision. Since the period of the flicker waveform is sufficiently long, as a rule, a process of the order of linear interpolation is sufficient. By generating pieces of data at L1 points from a larger number of pieces of sampling data, however, the LPF effect described before can be enhanced and the detection precision can hence be improved.

As an example, the so-called cubic interpolation technique can be adopted. In accordance with the technique, a three-order interpolation function is adapted and data at each point is generated on the basis of a predetermined number of integration values on both sides of the sampling position of data at each of the L1 points as shown in FIG. 14. In the example shown in FIG. 14, the integration values used as the basis for generating data are integration values for four lines. Thus, since the gravitational center of the newly generated data can be set at a position in the gap between pieces of original data (or the gap between pieces of original data for two successive lines) with a high degree of freedom, the flicker detection precision can be increased in a stable manner without regard to the number of pixels composing the image-pickup device employed in the video camera. That is to say, even if the thinning unit D2 (=L/L1) is not an integer due to the value of M representing the number of lines in the image-pickup device employed in the video camera, by storing an interpolation function suitable for the value of M in advance in a memory or the like, a period of the flicker waveform can be sampled with a high degree of accuracy so as to adjust the DFT window to match the period. Thus, much like the configuration shown in FIG. 10, it is possible to implement a small-size processing circuit offering improved flicker detection performance and good versatility.

It is to be noted that, in accordance with the first embodiment described above, the integration section 111 carries out an integration process on the input image signal In'(x, y) in line units. However, the integration interval is not limited to the interval between two successive lines. By lengthening the integration interval, the effect of the figure can be eliminated so as to sample flicker components with a higher degree of accuracy. Thus, the integration process can be carried out over a period of time exceeding a period corresponding to a line. That is to say, the integration period of the line integrator 210 may be set at a period corresponding to a plurality of lines. To put it concretely, for example, the integration process can be carried out in two-line units. In this case, the thinning section 220 receives pieces of sampling data at M/2 points for every field. As another alternative, data of the entire screen is not all used as an object of integration in each integration period. Instead, the data is used intermittently. As a further alternative, only data of specific areas is used.

In addition, in accordance with the first embodiment described above, the thinning section 220 outputs data sampled in a period of the flicker waveform. However, the sampling period does not have to be the one period of the flicker waveform. That is to say, the sampling period can be a plurality of periods of the flicker waveform.

In addition, in accordance with the first embodiment described above, the value of L1 representing the number data points output by the thinning section 220 as data points corresponding to a period of the flicker waveform is set at the second power of a number to allow the FFT technique to be adopted to replace the DFT technique as a method for transforming flicker components into frequency components. By adopting the FFT technique, the amount of processing can be made smaller than that of the DFT technique. Thus, the circuit size of the flicker reduction section 20 can be reduced. On top of that, the functions of the DFT processing can be implemented by execution of software with ease.

In addition, the first embodiment described above assumes a case in which the screen rate, which is a frame frequency or a field frequency, is fixed. However, an additional function of the image-pickup apparatus may allow an image-pickup process to be carried out at a higher screen rate. That is to say, the image-pickup apparatus can be conceivably provided as an apparatus having a variable screen rate. In the case of an image-pickup apparatus having not only a variable number of lines on the image-pickup device, but also a variable screen rate, not only are there more cases in which a multiple of the sampling interval of the integration section 111 unequal to a period of the flicker waveform, but the number of lines corresponding to a period of the flicker waveform is also very hardly an integer. Thus, by finding sampling data accurately corresponding to a period with a length equal to a period of the flicker wavelength as described above, it is possible to implement a processing circuit having high precision of the detection of flickers and having better versatility with respect to changes of the pixel count of the image-pickup device and changes of the screen rate.

Second Embodiment

Figure 15:
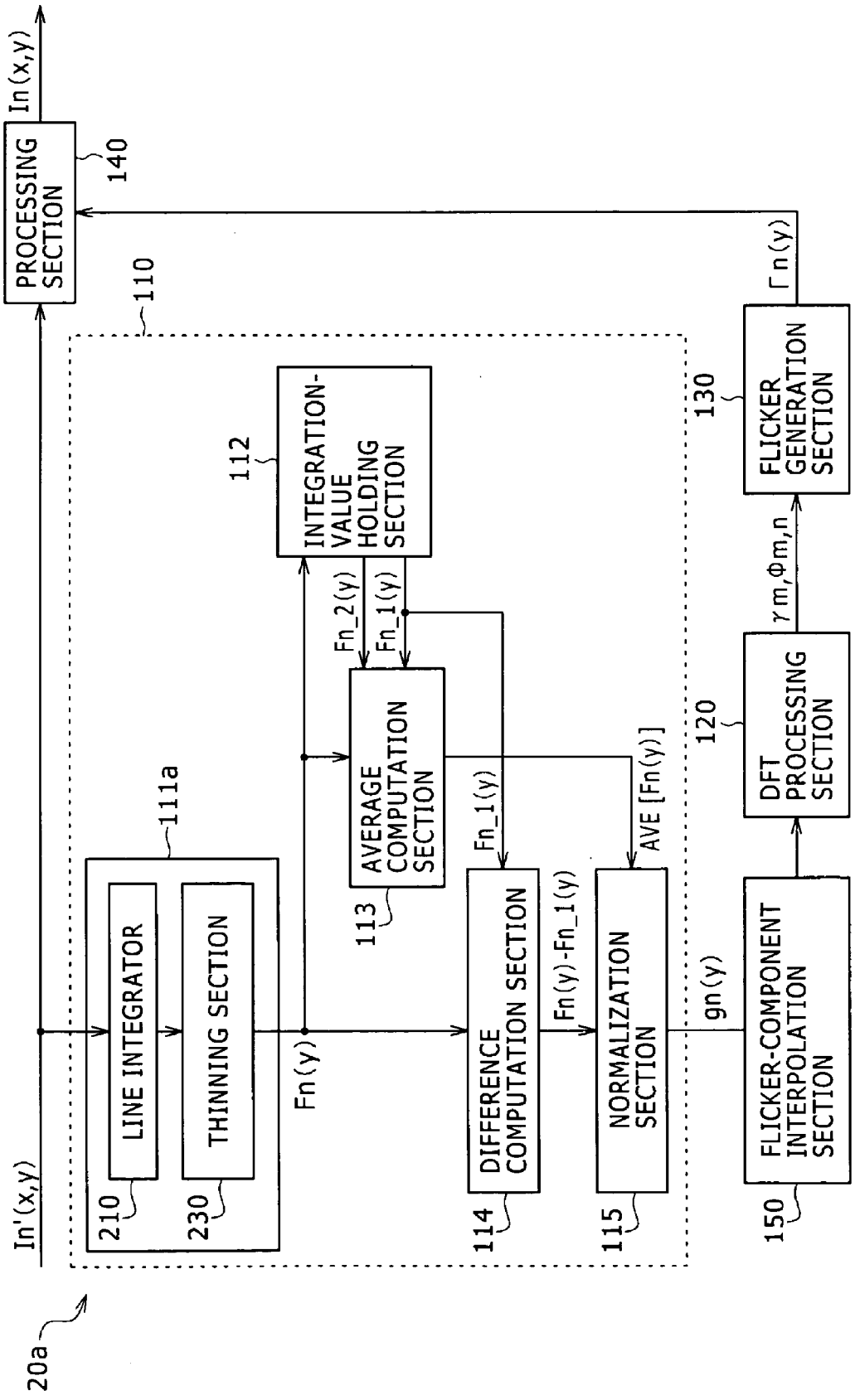
FIG. 15 is a block diagram showing a typical internal configuration of a flicker reduction section according to a second embodiment of the present invention.

FIG. 15 is a block diagram showing a typical internal configuration of a flicker reduction section 20a according to a second embodiment of the present invention. It is to be noted that, in the typical configuration shown in FIG. 15, components identical with their counterparts of the configuration shown in FIG. 3 are denoted by the same reference numerals as the counterparts and description of the components is not given.

In the second embodiment shown in FIG. 15, much like the first embodiment described earlier, instead of carrying out an interpolation process to produce pieces of data at L1 points accurately corresponding to a period with a length equal to a period (or a plurality of periods) of the flicker wavelength from integration values generated by the line integrator 210, an interpolation process is carried out. Then, the process generates pieces of sampling data accurately corresponding to a period with a length equal to a period (or a plurality of periods) of the flicker wavelength on the basis of flicker components (that is, a difference value gn (y)) computed by performing a difference computation process or normalization process based on an integration value obtained for every frame or every field. The generated sampling data is then supplied to the DFT processing section 120.

In the flicker reduction section 20a shown in FIG. 15, an integration section 111a includes a line integrator 210 and a thinning section 230. Much like the first embodiment, the line integrator 210 is a component for integrating an input image signal in line units. The thinning section 230 is a component having all but the same function as the V-direction thinning section 221 shown in FIG. 10. To put it concretely, the thinning section 230 thins the number of data points of integration values each obtained for a line to a small number of output data points by using a fixed thinning unit. It is to be noted that, as a thinning technique, the thinning section 230 may adopt an LPF thinning method described earlier. In addition, instead of formal processing, the thinning process can be carried out by merely outputting a piece of data for every predetermined number of pieces of input data.

The thinning section 230 outputs a predetermined number of pieces of data for every period with a length at least equal to a period of the flicker wavelength. For example, the thinning section 230 outputs pieces of data at L2 points for every period with a length at least equal to a period of the flicker wavelength. That is to say, since the sampling period of these pieces of data does not necessarily correspond to a period with a length equal to a period of the flicker wavelength in dependence on the number of pixels composing the image-pickup device employed in the digital camera, a sampling process is carried out during a period longer than a period of the flicker wavelength. Then, a flicker-component interpolation section 150 provided at a later stage generates interpolated data accurately corresponding to a period with a length equal to a period of the flicker wavelength.

It is to be noted that, much like the first embodiment, the integration period of the line integrator 210 can be a period corresponding to a plurality of lines such as a line or more lines. Instead of using data of all pixels in each integration period as an object of integration, the data of pixels can be used typically in an intermittent manner or data of only specific areas is used as an object of integration. In addition, integration values produced by the line integrator 210 can also be output to a component placed at a later stage as they are without providing the thinning section 230. In a word, the integration section 111a needs to merely output integration values representing predetermined areas on the screen at fixed intervals.

In addition, in the typical configuration shown in FIG. 15, the flicker-component interpolation section 150 carries out an interpolation process to generate a predetermined number of pieces of data corresponding to a period obtained by dividing a period of the flicker waveform into equal portions on the basis of flicker components extracted by the normalized integration value computation section 110. Specifically, the data is generated on the basis of the normalized difference value gn(y) output by the normalization section 115. The flicker-component interpolation section 150 supplies the generated pieces of data to the DFT processing section 120. The flicker-component interpolation section 150 selects at least two pieces of data on both sides of each post-interpolation point from the pieces of output data received from the normalization section 115 and carries out an interpolation process on the basis of the selected pieces of data. As an interpolation technique, it is possible to adopt for example the linear interpolation technique or a technique using an interpolation function such as the cubic interpolation method explained before by referring to FIG. 14.

In accordance with the flicker-component interpolation section 150 described above, pieces of data at L1 points accurately corresponding to a period of the flicker waveform are supplied to the DFT processing section 120. Thus, the DFT processing section 120 is capable of inferring flicker components of a period with a high degree of precision. Accordingly, much like the first embodiment, it is possible to implement a processing circuit having improved precision of the process to detect and correct flicker components and having better versatility with respect to changes of the pixel count of the image-pickup device and changes of the screen rate.

It is to be noted that, much like the first embodiment, by setting the number of data points output by the flicker-component interpolation section 150 as data points corresponding to a period of the flicker waveform at the second power of a number, it is possible to allow the FFT technique to be adopted to replace the DFT technique as a method for transforming flicker components into frequency components. Thus, the circuit size of the flicker reduction section 20a can be reduced. On top of that, the functions of the DFT processing can be implemented by execution of software with ease.

Third Embodiment

Figure 16:
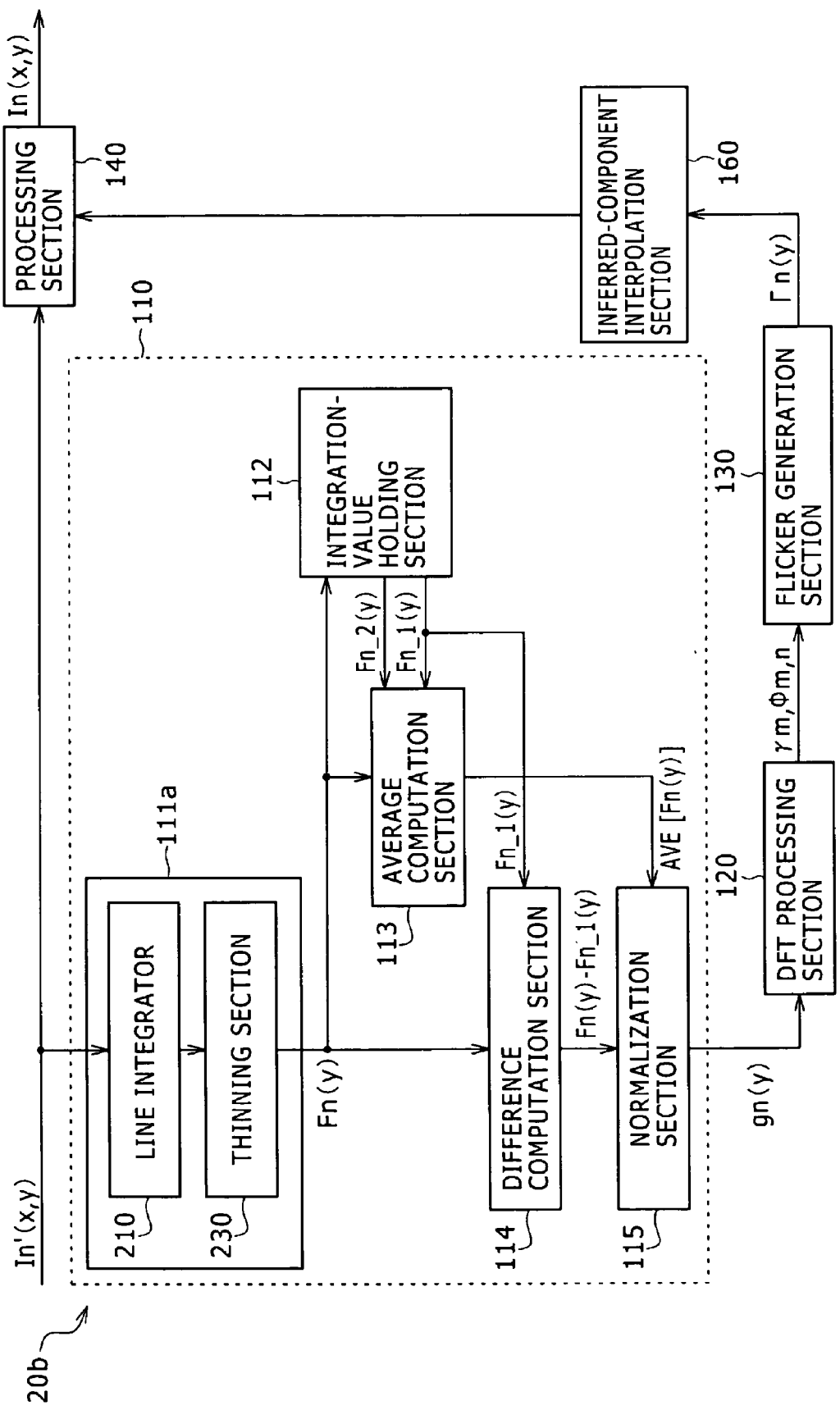
FIG. 16 is a block diagram showing a typical internal configuration of a flicker reduction section according to a third embodiment of the present invention.

FIG. 16 is a block diagram showing a typical internal configuration of a flicker reduction section 20b according to a third embodiment of the present invention. It is to be noted that, in the typical configuration shown in FIG. 16, components identical with their counterparts of the configuration shown in FIG. 15 are denoted by the same reference numerals as the counterparts and description of the components is not given.

The flicker reduction section 20b shown in FIG. 16 is different from the internal configuration of the flicker reduction section 20a shown in FIG. 15 in that, in the case of the flicker reduction section 20b, an inferred-component interpolation section 160 is provided between the flicker generation section 130 and the processing section 140 as a substitute for the flicker-component interpolation section 150. In the configuration of the flicker reduction section 20b, flicker components (or, strictly speaking, the flicker coefficient Γn (y)) inferred in computation processes carried out by the DFT processing section 120 and the flicker generation section 130 are in actuality output from the flicker generation section 130 as discrete pieces of data synchronized to typically data supplied to the DFT processing section 120. The inferred-component interpolation section 160 interpolates the discrete data group of the flicker components output by the flicker generation section 130 so as to match the phase of a data group to be corrected in the processing section 140.

Figure 17:
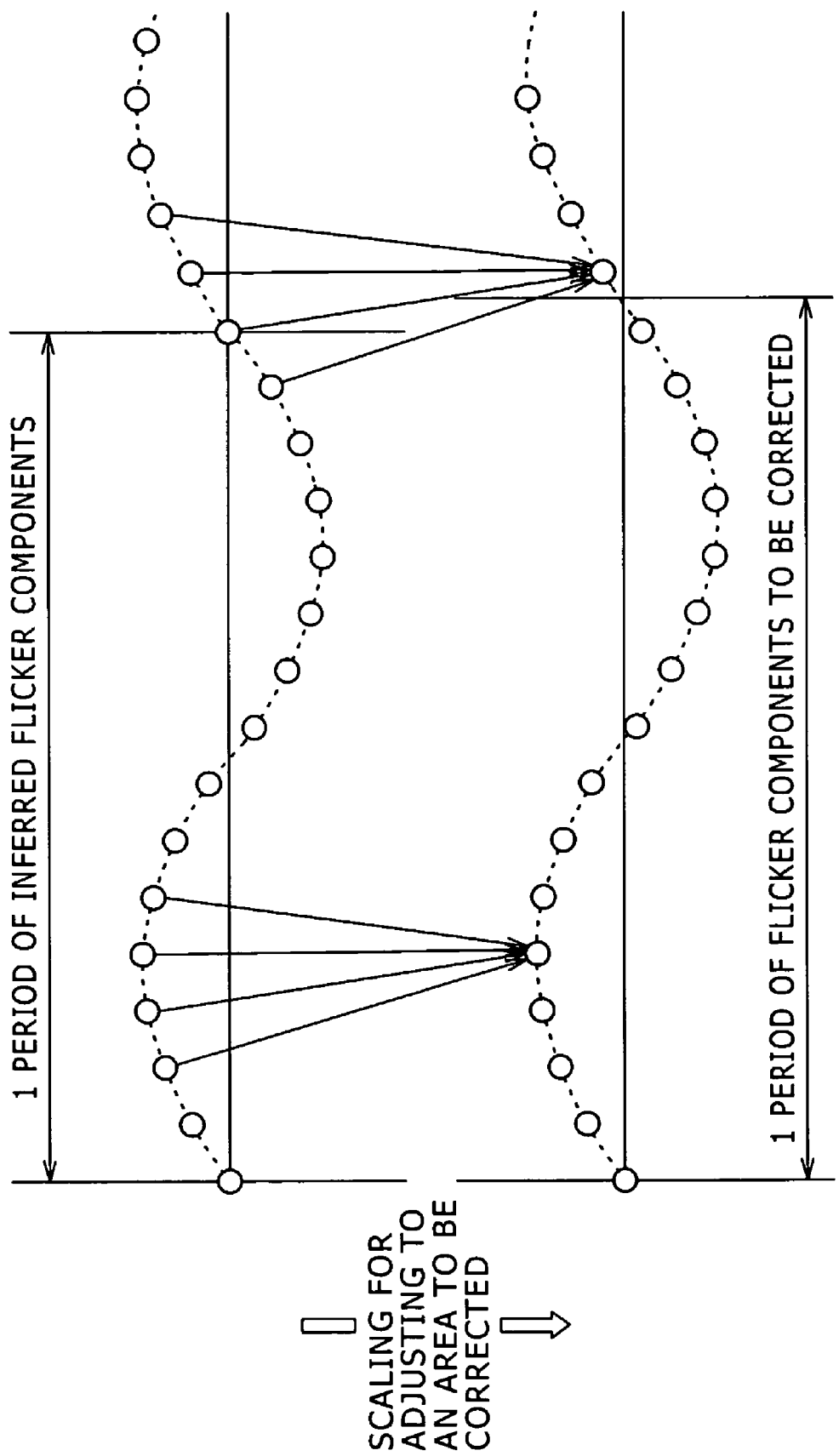
FIG. 17 is an explanatory diagram referred to in description of an interpolation process carried out by an inferred-component interpolation section employed in the third embodiment shown in FIG. 16.

FIG. 17 is an explanatory diagram to be referred to in description of an interpolation process carried out by the inferred-component interpolation section 160.

The flicker reduction section 20b shown in FIG. 16 does not include a function for interpolating sampling data so that the interpolated sampling data matches a period of the flicker waveform. (Such a function is provided in the thinning section 220 employed in the flicker reduction section 20 shown in FIG. 3 and the flicker-component interpolation section 150 employed in the flicker reduction section 20a shown in FIG. 15.) In the configuration of the flicker reduction section 20b, as described earlier, there are only very few cases in which a multiple of the sampling interval of the line integrator 210 or a multiple of the data output interval of the thinning section 230 placed at a stage following the line integrator 210 matches an interval having a length equal to a period of the flicker waveform due to variations of the pixel count of the image-pickup device and variations of the screen rate. Thus, since the phase of discrete data of a waveform inferred by the DFT process does not match the phase of corrected image data supplied to the processing section 140, a correction error is resulted in.

In a typical case shown in FIG. 17, for example, a DFT process is carried out on the basis of sampling data of a period having a length smaller than a period of the flicker waveform. Thus, the DFT processing section 120 unavoidably infers a waveform shown in the upper-side diagram of the figure as a waveform having a period shorter than the period of a waveform shown in the lower-side diagram of the figure. The inferred waveform is the actual flicker waveform included in the image data serving as an object of correction. Thus, if a correction process is carried out by using discrete data obtained as a result of the inference process as it is, a correction error is resulted in so that flicker components cannot be eliminated from the input image signal with a high degree of precision.

In order to solve the problem described above, in the inferred-component interpolation section 160 employed in this embodiment, a scaling process is carried out to output discrete data from the flicker generation section 130 synchronously with a correction timing set in the processing section 140. To put it concretely, on the basis of the discrete data received from the flicker generation section 130, the inferred-component interpolation section 160 carries out an interpolation process to generate data at any arbitrary number of points each synchronized with a correction timing set in the processing section 140 and outputs the generated data to the processing section 140.

In the typical case shown in FIG. 17, an interpolation process is carried out on pieces of data selected from the discrete pieces of data from the flicker generation section 130 as pieces of data located at four successive points in order to generate a piece of output data. Since the period of a flicker waveform received from the flicker generation section 130 is different from the period of the actual waveform to be corrected, the period of a flicker waveform received from the flicker generation section 130 is transformed into a period adjusted to the period of the actual waveform. Then, four adjacent points centered at a point synchronized with a correction timing set in the processing section 140 are selected among discrete pieces of data obtained as a result of the transformation as four points to be subjected to the interpolation process. In actuality, a specific number of discrete pieces of data in the inferred flicker components are transformed into any arbitrarily predetermined number of pieces of data and the pieces of data obtained as a result of the transformation process are sequentially output to the processing section 140 in synchronization with correction timings set in the processing section 140.

In addition, in the case of this embodiment, the smallest unit of the integration process carried out by the integration section 111$a$ is a line. Thus, the inferred-component interpolation section 160 sets the number of pieces of post-scaling data at such a value that the number of pieces of data corresponding to a line or a multiple of a line is synchronized to a timing to supply the image signal to the processing section 140. For example, the number of pieces of data generated by the inferred-component interpolation section 160 per period of the flicker waveform can be set at a value matching the number of pieces of data output by the line integrator 210 or the thinning section 230 per period of the flicker waveform. That is to say, each piece of post-scaling data is generated to correspond to a period obtained as a result of dividing a period of the actual flicker component included in the image signal or dividing a plurality of periods of the actual flicker component by a line or a multiple of a line. Then, the generated pieces of post-scaling data are sequentially output to the processing section 140 in synchronization with a timing to supply the image signal corresponding to each of the periods to the processing section 140.

As an interpolation technique adopted by the inferred-component interpolation section 160, it is possible to adopt for example the linear interpolation technique or a technique using an interpolation relation method such as the cubic interpolation method.

By carrying out the processing described above, the processing section 140 is capable of reducing flicker components with a high degree of precision without generating an error and, thus, capable of providing an image with a high picture quality as an image resulting from an image-pickup process.

Fourth Embodiment

Figure 18:
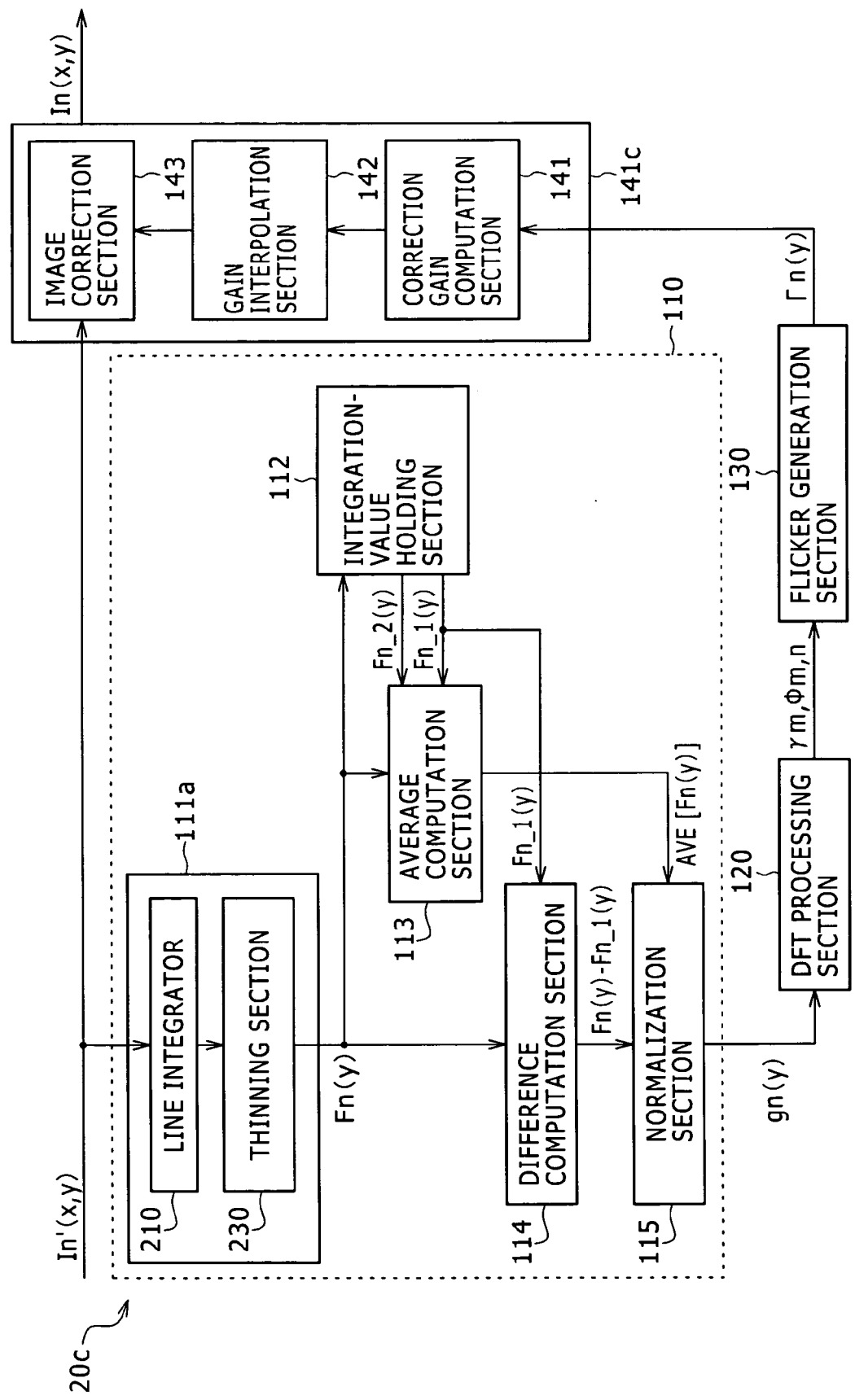
FIG. 18 is a block diagram showing a typical internal configuration of a flicker reduction section according to a fourth embodiment of the present invention.

FIG. 18 is a block diagram showing a typical internal configuration of a flicker reduction section 20$c$ according to a fourth embodiment of the present invention. It is to be noted that, in the typical configuration shown in FIG. 18, components identical with their counterparts of the configuration shown in FIG. 16 are denoted by the same reference numerals as the counterparts and description of the components is not given.

In the flicker reduction section 20$c$ shown in FIG. 18, a processing unit 140$c$ includes a correction-gain computation section 141, a gain interpolation section 142 and an image correction section 143. The correction-gain computation section 141 is a component for computing a correction gain on the basis of discrete data received from the flicker generation section 130 as the discrete data of the flicker component. The correction gain is a correction parameter for eliminating flicker components. The correction gain typically corresponds to the factor $1/[1+\Gamma n\,(y)]$ used in Eq. (21) given earlier. The gain interpolation section 142 is a component for carrying out a scaling process to output discrete data of the correction gain synchronously with a correction timing set in the image correction section 143. The image correction section 143 is a component for carrying out a process to eliminate a flicker component by multiplying the input image signal by the correction gain, which is obtained as a result of the scaling process carried out by the gain interpolation section 142, in accordance with Eq. (21).

The flicker reduction section 20$c$ includes the gain interpolation section 142 as a substitute for the inferred-component interpolation section 160 employed in the configuration shown in FIG. 16. On the basis of a correction gain obtained from an inferred flicker waveform, the gain interpolation section 142 carries out a scaling process to synchronize the discrete data of the correction gain with a correction-time timing. In this way, generation of a correction error can be avoided. The number of pieces of data output after the scaling process and the interpolation technique adopted in the scaling process are the same as those of the inferred-component interpolation section 160 described before. With this configuration, flicker components can be reduced with a high degree of precision and an image with a high picture quality can be obtained from an image-pickup process much like the flicker reduction section 20$b$ shown in FIG. 16.

Fifth Embodiment

Figure 19:
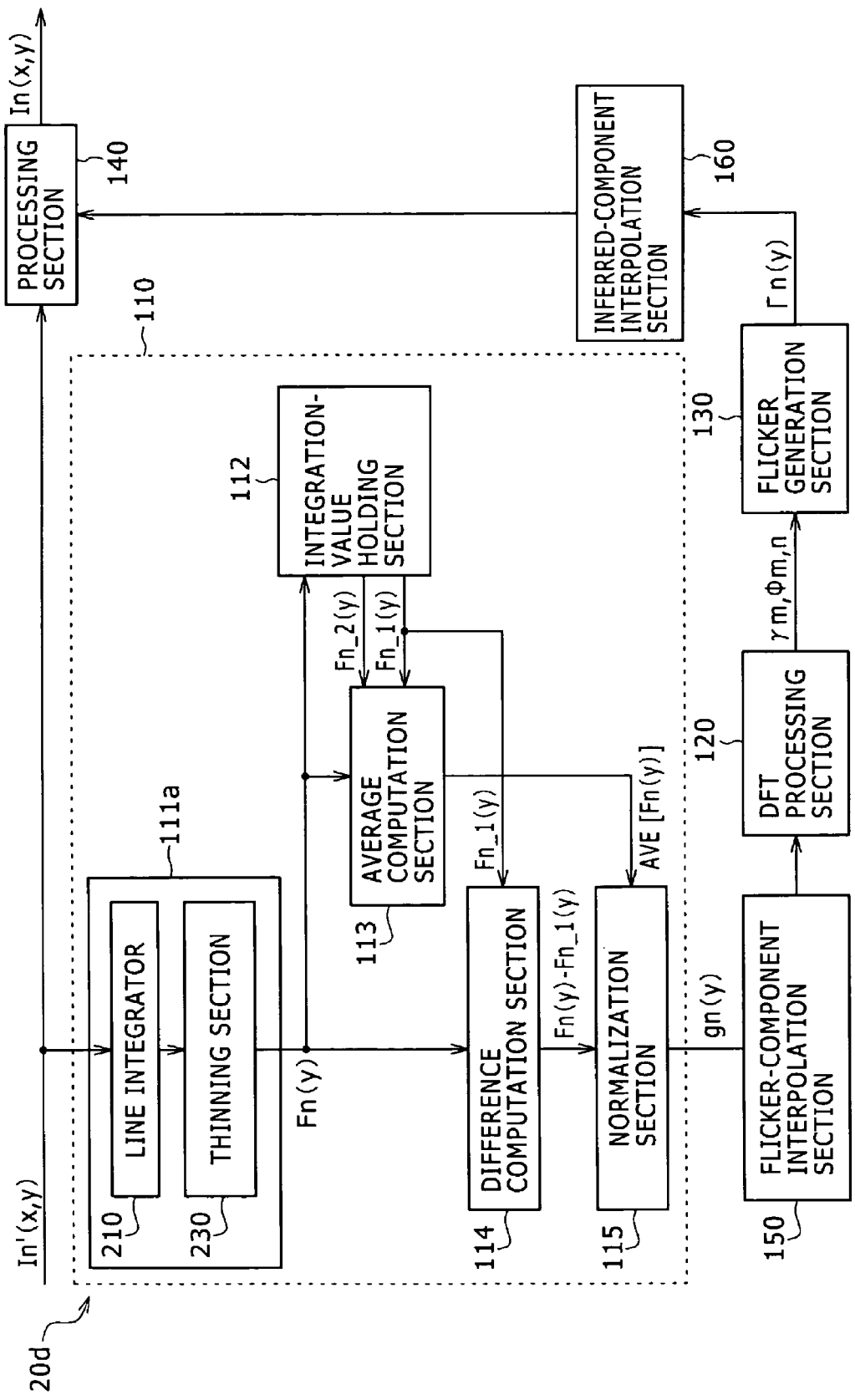
FIG. 19 is a block diagram showing a typical internal configuration of a flicker reduction section according to a fifth embodiment of the present invention.

FIG. 19 is a block diagram showing a typical internal configuration of a flicker reduction section 20$d$ according to a fifth embodiment of the present invention. It is to be noted that, in the typical configuration shown in FIG. 19, components identical with their counterparts of the configuration shown in FIGS. 15 and 16 are denoted by the same reference numerals as the counterparts and description of the components is not given.

Much like the first and second embodiments described earlier, the flicker reduction section 20$d$ shown in FIG. 19 has both an interpolation function and a scaling function. The interpolation function is a function to adjust sampled data to a period of the flicker waveform or a plurality of periods of the flicker waveform. On the other hand, the scaling function is a function for synchronizing discrete data inferred by a DFT process as the discrete data of a flicker waveform to a correction timing set in the processing section 140. In this embodiment, the interpolation function is provided in the flicker-component interpolation section 150 explained earlier by referring to FIG. 15 whereas the scaling function is provided in the inferred-component interpolation section 160 explained earlier by referring to FIG. 16. It is thus possible to obtain both the effect of reducing the number of correction errors generated in the DFT process to detect flickers and the effect of reducing the number of correction errors generated in processing to correct flicker components inferred in the DFT process. It is to be noted that the same effects can be obtained even if the integration section 111 explained earlier by referring to FIG. 3 is provided as a component for executing the former function or even if the processing unit 140c explained earlier by referring to FIG. 18 is provided as a component for executing the latter function.

Figure 20:
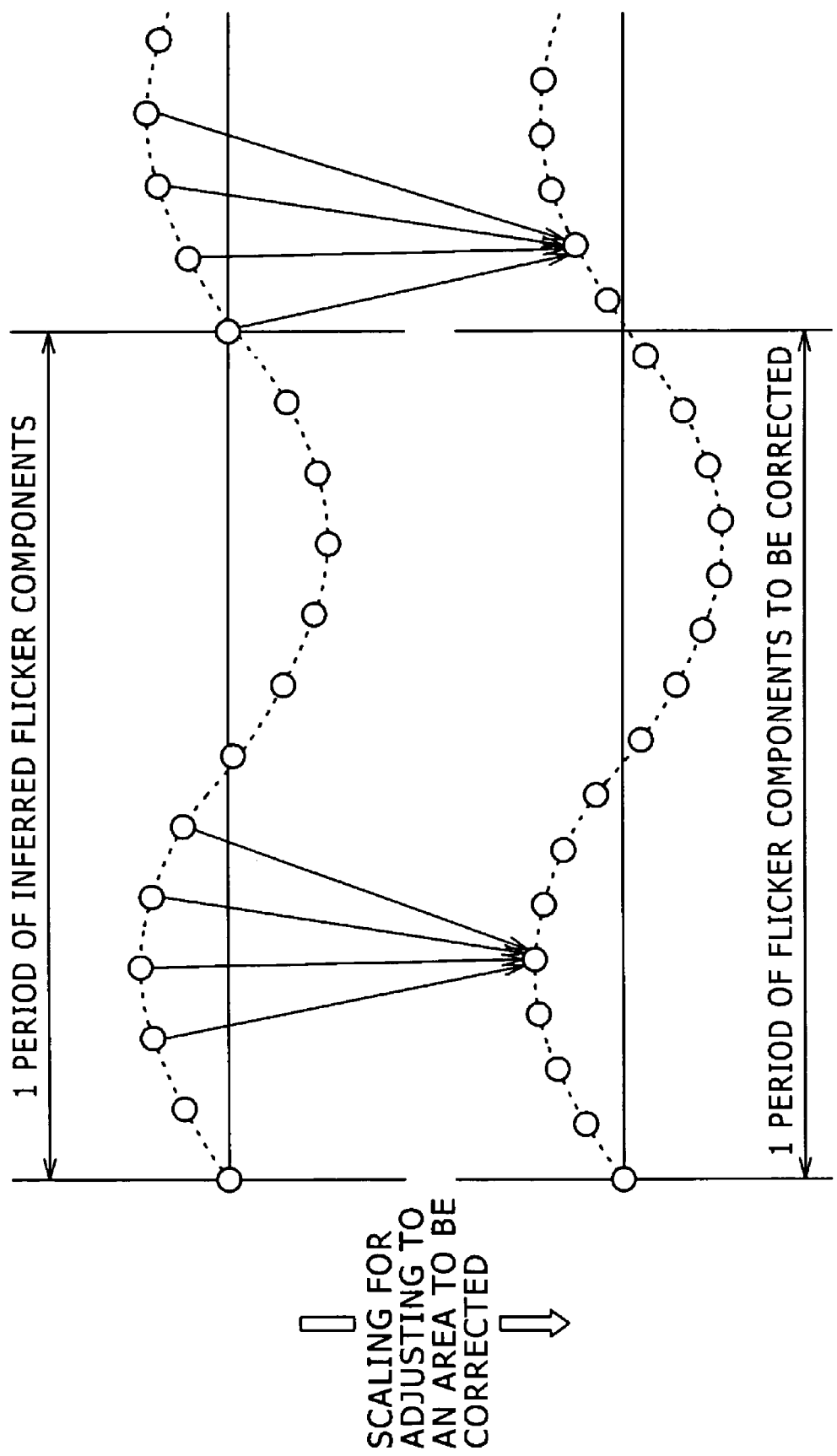
FIG. 20 is an explanatory diagram referred to in description of the interpolation process carried out by the inferred-component interpolation section employed in the fifth embodiment shown in FIG. 19.
Figure 21:
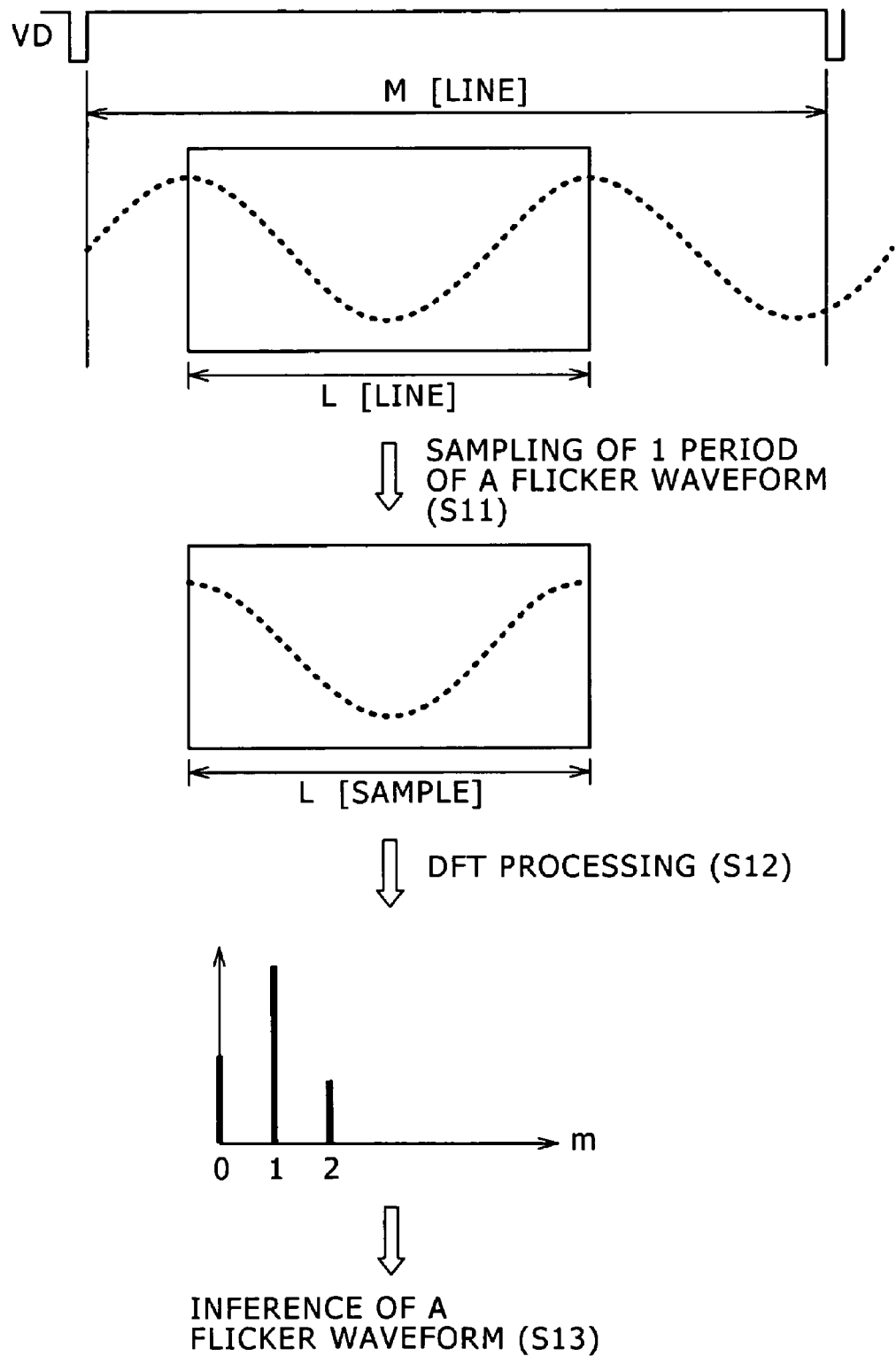
FIG. 21 is an explanatory diagram referred to in describing an outline of the conventional flicker detection procedure.
Figure 22:
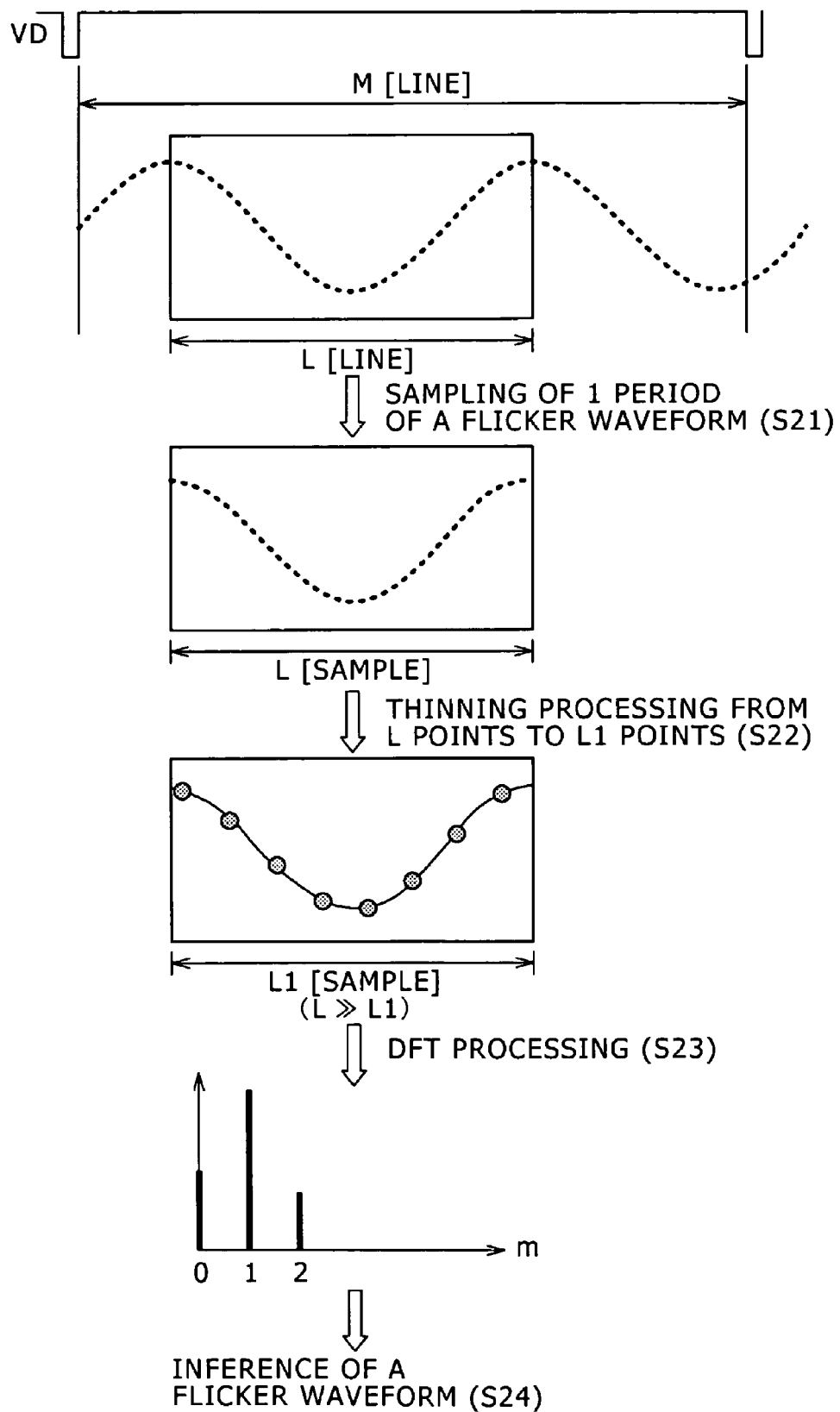
FIG. 22 is an explanatory diagram referred to in describing an outline of a flicker detection procedure executed to thin data being sampled.

FIG. 20 is an explanatory diagram referred to in description of the interpolation process carried out by the inferred-component interpolation section 160 employed in the configuration shown in FIG. 19.

In the flicker reduction section 20d shown in FIG. 19, data sampled at equal intervals in a process carried out by the flicker-component interpolation section 150 is supplied to the DFT processing section 120. The data is sampled in the flicker-component interpolation section 150 in a period accurately corresponding to a period of the flicker waveform or a plurality of periods of the flicker waveform. Thus, the period of a waveform shown in the upper-side diagram of FIG. 20 as a flicker waveform output by the flicker generation section 130 matches the period of a waveform shown in the lower-side diagram of FIG. 20 as an actual flicker waveform included in the image signal. Since the interval of pieces of discrete data on the inferred flicker waveform is different from the interval of pieces of data sampled by the integration section 111a, however, a correction error will be generated if the inferred flicker waveform is used in the correction process in the processing section 140 as it is.

In order to solve the above problem, a discrete-data group corresponding to the inferred flicker waveform is transformed into another discrete-data group synchronized to a correction timing set in the processing section 140 in an interpolation process carried out by the inferred-component interpolation section 160. In the interpolation process shown in FIG. 20, four pieces of discrete data in the inferred flicker waveform are subjected to the interpolation process to generate a piece of data. In this way, the generated piece of data can be synchronized to a correction timing set in the processing section 140 so that generation of a correction error can be avoided. It is to be noted that, even if pieces of sampled data supplied to the DFT processing section 120 are interpolated, it may be still necessary to transform the period of the inferred flicker waveform into another period in some cases.

As described above, the flicker reduction section 20d has both the interpolation function to adjust sampled data to a period of the flicker waveform or a plurality of periods of the flicker waveform and the scaling function for synchronizing discrete data inferred by a DFT process as the discrete data of a flicker waveform to a correction timing set in the processing section 140. Since these functions allow the number of flicker-detection errors and the number of correction errors generated in the DFT process to be reduced, the flicker component can be eliminated with a higher degree of accuracy. Thus, the picture quality of an image obtained as a result of an image-pickup process can be further improved.

It is to be noted that, in the embodiments described above, data output by the line integrator 210 is thinned. However, the embodiments can also be applied to a case in which a thinning process is not carried out. For example, if there are a margin in the processing performance in the flicker reduction section and a margin in the design area of a memory circuit used for storing integration values, the sampling unit of the integration values can be set at the smallest value, which is a line. As described above, in dependence on the number of lines on the image-pickup device and the screen rate, the number of lines corresponding to a period of the flicker waveform may not be an integer in some cases. By applying the present invention to such cases, however, the number of flicker detection errors and the number of correction errors can be reduced.

In addition, in the embodiments described above, a CMOS image sensor is employed as the image-pickup device. However, an image sensor other than the CMOS image sensor can also be employed. An example of the other image sensor is a MOS-type image sensor. An image-pickup device of another XY address scanning type can also be employed and the embodiments can be applied to such other image-pickup devices. On top of that, the present invention can also be applied to a variety of image-pickup apparatus each employing an image-pickup device of the XY address scanning type and applied to apparatus each provided with such a function. Examples of the apparatus with such a function are a hand phone and a PDA (Personal Digital Assistant).

In addition, the present invention can also be applied to an image-processing apparatus for carrying out various kinds of processing such as processing to process an image signal generated by a camera with a small size and processing to correct an image obtained as a result of an image-pickup process. Typically, a camera with a small size is provided for a television phone connected to a PC (Personal Computer) or the like or provided for use with game software.

On top of that, the processing functions described above can be implemented by using a computer. In this case, the computer executes a program prescribing the processing of the functions of the image-pickup and image-processing apparatus. To be more specific, the functions of the image-pickup and image-processing apparatus are the functions executed by the flicker reduction section and other sections. In other words, through execution of the program by using the computer, the processing functions can be implemented in the computer. The program used for prescribing the substance of the processing can be recorded in advance in a recording medium that can be read by the computer. Examples of the recording medium that can be read by the computer are a magnetic recording medium, an optical disk, a magneto-optical disk and a semiconductor memory.

As media for distributing such a program, a transportable recording medium used for storing the program is sold in the market. Examples of the transportable recording medium are the optical disk and the semiconductor memory. In addition, the program can also be stored in a storage medium employed in a server computer, which is capable of transmitting the program to another computer by way of a network.

The computer for executing the program stores the program in its own storage section used for storing the program, which can be a program recorded in advance in the transportable recording medium or a program transmitted from the server computer. Then, the computer reads out the program from the storage section and carries out processing by executing the program. It is to be noted that the computer is also capable of reading out the program directly from the transportable recording medium and carrying out the processing by execution of the program. In addition, every time the program is received from the server computer, the computer is capable of immediately carrying out the processing by execution of the program.

By the way, it should be understood by those skilled in the art that a variety of modifications, combinations, sub-combinations and alterations may occur in dependence on design requirements and other factors insofar as they are within the scope of the appended claims or the equivalents thereof.

The invention claimed is:

1. An image-processing apparatus for processing an image signal, comprising:
   integration means for integrating the image signal in more than one unit of horizontal synchronization period;
   interpolation means for carrying out an interpolation process on the basis of integration values output by the integration means, a number of the integration values output by the integration means being reduced at a predetermined rate under control of the interpolation means, in order to generate integration values corresponding to a predetermined number of sampling positions set in advance during at least one period of flickers appearing on a screen under a fluorescent lamp;

normalization means for normalizing an integration value output by the interpolation means or for normalizing a difference value between integration values output by the interpolation means as integration values for adjacent fields or adjacent frames, respectively;

frequency analysis means for extracting a spectrum of the normalized integration value or the difference values output by the normalization means; and flicker inference means for inferring a flicker component from the spectrum extracted by the frequency analysis means.

2. The image-processing apparatus according to claim 1, wherein the predetermined number of sampling positions is smaller than the number of integration values output by the integration means during the at least one period of flickers.

3. The image-processing apparatus according to claim 2, wherein:
the interpolation means has output control means for reducing the number of integration values output by the integration means at the predetermined rate; and
the interpolation means carries out an interpolation process on the basis of integration values output by the output control means in order to generate integration values corresponding to the sampling positions.

4. The image-processing apparatus according to claim 3, wherein the output control means has a low-pass filter for averaging every predetermined number of integration values output by the integration means.

5. The image-processing apparatus according to claim 3, wherein the output control means reduces the number of integration values output by the integration means during a period of flickers or a plurality of periods of flickers or a period longer than the length.

6. The image-processing apparatus according to claim 1, wherein the interpolation means carries out an interpolation process by using an interpolation function on the basis of a predetermined number of integration values output by the integration means for each of the sampling positions in order to generate an integration value corresponding to each of the sampling positions.

7. The image-processing apparatus according to claim 6, wherein the interpolation means carries out an interpolation process by selecting a predetermined number of integration values from integration values output by the integration means during a period of flickers or a plurality of periods of flickers in order to generate an integration value corresponding to each of the sampling positions.

8. The image-processing apparatus according to claim 1, wherein the normalization means divides a difference value between integration values output by the interpolation means as integration values for adjacent fields or adjacent frames, respectively, by an average of integration values output by the interpolation means as integration values for a plurality of successive fields or a plurality of successive frames, respectively.

9. The image-processing apparatus according to claim 1, wherein the normalization means divides a difference value between integration values output by the interpolation means as integration values for adjacent fields or adjacent frames, respectively, by an integration value output by the interpolation means.

10. The image-processing apparatus according to claim 1, further including:
inferred-value interpolation means for carrying out an interpolation process on the basis of discrete values of a flicker component inferred by the flicker inference means in order to generate a predetermined number of pieces of data during a period of flickers or a plurality of periods of flickers as pieces of data each prescribed to have an output timing synchronized with the period of an integration unit used by the integration means or synchronized with the period of a multiple of the integration unit; and
image correction means for eliminating a flicker component from the image signal on the basis of a value output from the interpolation process carried out by the inferred-value interpolation means as an inferred value of the flicker component.

11. The image-processing apparatus according to claim 1, further including:
correction-parameter computation means for computing a correction parameter for eliminating a flicker component on the basis of an inferred value of a flicker component inferred by the flicker inference means;
parameter interpolation means for carrying out an interpolation process on the basis of discrete values of the correction parameters computed by the correction-parameter computation means in order to generate a predetermined number of pieces of data during a period of a flicker component or a plurality of periods of a flicker component included in the image signal as pieces of data each prescribed to have an output timing synchronized with the period of an integration unit used by the integration means or synchronized with the period of a multiple of the integration unit; and
image correction means for eliminating a flicker component from the image signal by using data output from the interpolation process carried out by the parameter interpolation means as the data of the correction parameter.

12. An image-processing apparatus for processing an image signal, comprising:
integration means for integrating the image signal in more than one unit of horizontal synchronization period, the integration means reducing a number of integration values output at a predetermined rate;
normalization means for normalizing an integration value of the integration values output by the integration means or for normalizing a difference value between the integration values output by the integration means as integration values for adjacent fields or adjacent frames, respectively;
interpolation means for carrying out an interpolation process on the basis of normalized integration or difference values output by the normalization means in order to generate data corresponding to a predetermined number of sampling positions set in advance during at least one period of flickers appearing on a screen under a fluorescent lamp;
frequency analysis means for extracting a spectrum of data output by the interpolation means; and
flicker inference means for inferring a flicker component from the spectrum extracted by the frequency analysis means.

13. The image-processing apparatus according to claim 12, further including:
inferred-value interpolation means for carrying out an interpolation process on the basis of discrete values of a flicker component inferred by the flicker inference means in order to generate a predetermined number of pieces of data during a period of flickers or a plurality of periods of flickers as pieces of data each prescribed to have an output timing synchronized with the period of an integration unit used by the integration means or synchronized with the period of a multiple of the integration unit; and image correction means for eliminating a flicker component from the image signal on the basis of a value output from the interpolation process carried out by the inferred-value interpolation means as an inferred value of the flicker component.

14. The image-processing apparatus according to claim 12, further including:

correction-parameter computation means for computing a correction parameter for eliminating a flicker component on the basis of an inferred value of a flicker component inferred by the flicker inference means;

parameter interpolation means for carrying out an interpolation process on the basis of discrete values of the correction parameters computed by the correction-parameter computation means in order to generate a predetermined number of pieces of data during a period of flickers or a plurality of periods of a flicker component included in the image signal as pieces of data each prescribed to have an output timing synchronized with the period of an integration unit used by the integration means or synchronized with the period of a multiple of the integration unit; and image correction means for eliminating a flicker component from the image signal by using data output from the interpolation process carried out by the parameter interpolation means as the data of the correction parameter.

15. An image-pickup apparatus for taking an image by using a solid-state image-pickup device of an XY address scanning type, comprising:

integration means for integrating an image signal obtained as a result of an image-pickup process in more than one unit of horizontal synchronization period;

interpolation means for carrying out an interpolation process on the basis of integration values output by the integration means, a number of the integration values output by the integration means being reduced at a predetermined rate under control of the interpolation means, in order to generate integration values corresponding to a predetermined number of sampling positions set in advance during at least one period of flickers appearing on a screen under a fluorescent lamp;

normalization means for normalizing an integration value output by the interpolation means or for normalizing a difference value between integration values output by the interpolation means as integration values for adjacent fields or adjacent frames, respectively;

frequency analysis means for extracting a spectrum of the normalized integration value or the difference values output by the normalization means; and flicker inference means for inferring a flicker component from the spectrum extracted by the frequency analysis means.

16. An image-pickup apparatus for taking an image by using a solid-state image-pickup device of an XY address scanning type, comprising:

integration means for integrating an image signal obtained as a result of an image-pickup process in more than one unit of horizontal synchronization period, the integration means reducing a number of integration values output at a predetermined rate;

normalization means for normalizing an integration value of the integration values output by the integration means or for normalizing a difference value between the integration values output by the integration means as integration values for adjacent fields or adjacent frames, respectively;

interpolation means for carrying out an interpolation process on the basis of normalized integration or difference values output by the normalization means in order to generate integration values corresponding to a predetermined number of sampling positions set in advance during at least one period of flickers appearing on a screen under a fluorescent lamp;

frequency analysis means for extracting a spectrum of data output by the interpolation means; and flicker inference means for inferring a flicker component from the spectrum extracted by the frequency analysis means.

17. An image-processing method for detecting flickers appearing on a screen under a fluorescent lamp, comprising:

integrating an image signal in more than one unit of horizontal synchronization period;

carrying out an interpolation process on the basis of integration values obtained in the integrating step, a number of the integration values obtained in the integrating step being reduced at a predetermined rate under control of the interpolation process, in order to generate integration values corresponding to a predetermined number of sampling positions set in advance during at least one period of flickers appearing on a screen under a fluorescent lamp;

normalizing an integration value output by the interpolation process or normalizing a difference value between integration values output by the interpolation process as integration values for adjacent fields or adjacent frames, respectively;

extracting a spectrum of the normalized integration value or the difference values output by the normalizing step; and inferring a flicker component from the extracted spectrum.

18. An image-processing method for detecting flickers appearing on a screen under a fluorescent lamp, comprising:

integrating an image signal in more than one unit of horizontal synchronization period, wherein the integrating includes reducing a number of integration values obtained at a predetermined rate;

normalizing an integration value of the integration values obtained in the integrating step or normalizing a difference value between the integration values obtained in the integrating step as integration values for adjacent fields or adjacent frames, respectively;

carrying out an interpolation process on the basis of normalized integration or difference values output by the normalizing step in order to generate integration values corresponding to a predetermined number of sampling positions set in advance during at least one period of flickers appearing on a screen under a fluorescent lamp;

extracting a spectrum of data output by the interpolation process; and inferring a flicker component from the extracted spectrum.

19. A non-transitory storage medium containing an image-processing program to be executed by a computer for carrying out a process of detecting flickers appearing on a screen under a fluorescent lamp, the process comprising:

integrating an image signal in more than one unit of horizontal synchronization period;

carrying out an interpolation process on the basis of integration values obtained in the integrating step, a number of the integration values obtained in the integrating step being reduced at a predetermined rate under control of the interpolation process, in order to generate integration values corresponding to a predetermined number of sampling positions set in advance during at least one period of flickers appearing on a screen under a fluorescent lamp;

normalizing an integration value output by the interpolation process or normalizing a difference value between integration values output by the interpolation process as integration values for adjacent fields or adjacent frames, respectively;

extracting a spectrum of the normalized integration value or the difference values output by the normalizing step; and inferring a flicker component from the extracted spectrum.

20. A non-transitory storage medium containing an image-processing program to be executed by a computer for carrying out a process of detecting flickers appearing on a screen under a fluorescent lamp, the process comprising:

integrating an image signal in more than one unit of horizontal synchronization period, wherein the integrating includes reducing a number of integration values obtained at a predetermined rate;

normalizing an integration value of the integration values obtained in the integrating step or normalizing a difference value between the integration values obtained in the integrating step as integration values for adjacent fields or adjacent frames, respectively;

carrying out an interpolation process on the basis of normalized integration or difference values output by the normalizing step in order to generate integration values corresponding to a predetermined number of sampling positions set in advance during at least one period of flickers appearing on a screen under a fluorescent lamp;

extracting a spectrum of data output by the interpolation process; and inferring a flicker component from the extracted spectrum.

21. An image-processing apparatus for processing an image signal, comprising:

an integration section configured to integrate the image signal in more than one unit of horizontal synchronization period;

an interpolation section configured to carry out an interpolation process on the basis of integration values output by the integration section, a number of integration values output by the integration section being reduced at a predetermined rate under control of the interpolation section, in order to generate integration values corresponding to a predetermined number of sampling positions set in advance during at least one period of flickers appearing on a screen under a fluorescent lamp;

a normalization section configured to normalize an integration value output by the interpolation section or to normalize a difference value between integration values output by the interpolation section as integration values for adjacent fields or adjacent frames, respectively;

a frequency analysis section configured to extract a spectrum of the normalized integration value or the difference values output by the normalization section; and a flicker inference section configured to infer a flicker component from the spectrum extracted by the frequency analysis section.

22. An image-processing apparatus for processing an image signal, comprising:

an integration section configured to integrate the image signal in more than one unit of horizontal synchronization period, the integration section being configured to reduce a number of integration values output at a predetermined rate;

a normalization section configured to normalize an integration value of the integration values output by the integration section or to normalize a difference value between the integration values output by the integration section as integration values for adjacent fields or adjacent frames, respectively;

an interpolation section configured to carry out an interpolation process on the basis of normalized integration or difference values output by the normalization section in order to generate data corresponding to a predetermined number of sampling positions set in advance during at least one period of flickers appearing on a screen under a fluorescent lamp;

a frequency analysis section configured to extract a spectrum of data output by the interpolation section; and a flicker inference section configured to infer a flicker component from the spectrum extracted by the frequency analysis section.

23. An image-pickup apparatus for taking an image by using a solid-state image-pickup device of an XY address scanning type, comprising:

an integration section configured to integrating an image signal obtained as a result of an image-pickup process in more than one unit of horizontal synchronization period;

an interpolation section configured to carry out an interpolation process on the basis of integration values output by the integration section, a number of the integration values output by the integration section being reduced at a predetermined rate under control of the interpolation section, in order to generate integration values corresponding to a predetermined number of sampling positions set in advance during at least one period of flickers appearing on a screen under a fluorescent lamp;

a normalization section configured to normalize an integration value output by the interpolation section or to normalize a difference value between integration values output by the interpolation section as integration values for adjacent fields or adjacent frames, respectively;

a frequency analysis section configured to extract a spectrum of the normalized integration value or the difference values output by the normalization section; and a flicker inference section configured to infer a flicker component from the spectrum extracted by the frequency analysis section.

24. An image-pickup apparatus for taking an image by using a solid-state image-pickup device of an XY address scanning type, comprising:

an integration section configured to integrate an image signal obtained as a result of an image-pickup process in more than one unit of horizontal synchronization period, the integration section being configured to reduce a number of integration values output at predetermined rate;

a normalization section configured to normalize an integration value of the integration values output by the integration section or to normalize a difference value between the integration values output by the integration section as integration values for adjacent fields or adjacent frames, respectively;

an interpolation section configured to carry out an interpolation process on the basis of normalized integration or difference values output by the normalization section in order to generate integration values corresponding to a predetermined number of sampling positions set in advance during at least one period of flickers appearing on a screen under a fluorescent lamp;

a frequency analysis section configured to extract a spectrum of data output by the interpolation section; and a flicker inference section configured to infer a flicker component from the spectrum extracted by the frequency analysis section.

25. An image-processing apparatus for processing an image signal, comprising:

integration means for integrating the image signal in unit of more than one line of the image signal;

interpolation means for interpolating integral values corresponding to a predetermined number of sampling positions set in advance during at least one period of flickers appearing on a screen under a fluorescent lamp, based on integration values output by the integration means, the integration values output by the integration means being reduced at a predetermined rate under control of the interpolation means;

normalization means for normalizing an integration value output by the interpolation means or for normalizing a difference value between respective integration values output by the interpolation means for time-adjacent images;

frequency analysis means for extracting a spectrum of the normalized integration value or the difference values output by the normalization means;

flicker inference means for inferring a flicker component from the spectrum extracted by the frequency analysis means; and means for correcting the image based on the inferred flicker component.

* * * * *